(12) United States Patent
Doba et al.

(10) Patent No.: US 12,412,306 B2
(45) Date of Patent: Sep. 9, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Kentaro Doba, Tokyo (JP); Yasuhiro Sutou, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 14 days.

(21) Appl. No.: 18/287,962

(22) PCT Filed: Jan. 13, 2022

(86) PCT No.: PCT/JP2022/000907
§ 371 (c)(1),
(2) Date: Oct. 23, 2023

(87) PCT Pub. No.: WO2022/249534
PCT Pub. Date: Dec. 1, 2022

(65) Prior Publication Data
US 2024/0202974 A1    Jun. 20, 2024

(30) Foreign Application Priority Data

May 26, 2021    (JP) .................................. 2021-088588

(51) Int. Cl.
*G06T 7/80*    (2017.01)
*G06V 10/44*    (2022.01)

(52) U.S. Cl.
CPC ................ *G06T 7/80* (2017.01); *G06V 10/44* (2022.01)

(58) Field of Classification Search
CPC .................................. G06T 7/80; G06V 10/44
(Continued)

(56) References Cited

U.S. PATENT DOCUMENTS

| | | | |
|---|---|---|---|
| 10,013,761 B2* | 7/2018 | Natroshvili | ............... G06T 7/80 |
| 10,356,394 B2* | 7/2019 | Kim | ..................... H04N 13/239 |
| 12,198,383 B2* | 1/2025 | Shimizu | ................... G01C 3/00 |

FOREIGN PATENT DOCUMENTS

| | | |
|---|---|---|
| JP | 2013-123123 A | 6/2013 |
| JP | 2017-533052 A | 11/2017 |

(Continued)

*Primary Examiner* — Trang U Tran
(74) *Attorney, Agent, or Firm* — Paratus Law Group, PLLC

(57) ABSTRACT

There is proposed a new and improved information processing apparatus, an information processing method, and a program capable of more simply detecting whether or not a deviation related to a camera parameter has occurred in a plurality of cameras. The information processing apparatus includes a calculator that calculates a three-dimensional position of a feature point on the basis of each of images obtained by imaging a subject at a first timing by a plurality of cameras and an external parameter of the plurality of cameras, the feature point being included in each of the images, a first estimator that estimates a first external parameter on the basis of one image included in the images obtained by imaging the subject at a second timing by the plurality of cameras and the three-dimensional position of the feature point, the first external parameter being an external parameter of a camera that has captured the one image among the plurality of cameras at the second timing, a second estimator that estimates a second external parameter that is an external parameter of any one camera of the plurality of cameras at the first timing on the basis of the first external parameter estimated by the first estimator, and a determiner that determines whether or not a deviation related to the external parameter has occurred in the plurality of cameras on the basis of the second external parameter of any one camera of the plurality of cameras and a previous external parameter of the any one camera, the second (Continued)

external parameter having been estimated by the second estimator.

14 Claims, 12 Drawing Sheets

(58) Field of Classification Search
USPC .......................................................... 348/187
See application file for complete search history.

(56) References Cited

FOREIGN PATENT DOCUMENTS

| JP | 2020-107938 A | 7/2020 |
| WO | WO 2018/181249 A1 | 10/2018 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/000907 (filed on Jan. 13, 2022) under 35 U.S.C. § 371, which claims priority to Japanese Patent Application No. 2021-088588 (filed on May 26, 2021), which are all hereby incorporated by reference in their entirety.

TECHNICAL FIELD

The present disclosure relates to an information processing apparatus, an information processing method, and a program.

BACKGROUND ART

In recent years, a technique of estimating a distance from a plurality of cameras to an object included in each image by using each image obtained by imaging by the plurality of cameras has been developed. In order to estimate such a distance with high accuracy, a camera parameter of the plurality of cameras needs to be accurate.

The camera parameter includes, for example, an external parameter that depends on the positions and orientations of the plurality of cameras. Therefore, in a case where a deviation occurs in the positions and orientations of the plurality of cameras due to the influence of disturbance such as a change in environmental temperature and vibration, the accuracy of the external parameters can be reduced, and the estimation accuracy of a distance measurement value can also be reduced. As a result, a technique of detecting whether or not a deviation occurs in the position and orientation of a camera has been developed. For example, Patent Document 1 discloses a technique of estimating a camera parameter by using moving distance information of a mobile body on which a plurality of cameras is mounted and a plurality of images.

CITATION LIST

Patent Document

Patent Document 1: Japanese Patent Application Laid-Open No. 2020-107938

SUMMARY OF THE INVENTION

Problems to be Solved by the Invention

However, in the technique disclosed in Patent Document 1, the mobile body needs to be equipped with a plurality of cameras and a sensor capable of acquiring moving distance information. Therefore, it is difficult to apply the technique to a mobile body that does not include a sensor capable of acquiring moving distance information.

Therefore, the present disclosure proposes a new and improved information processing apparatus, an information processing method, and a program capable of more simply detecting whether or not a deviation related to a camera parameter has occurred in a plurality of cameras.

Solutions to Problems

The present disclosure provides an information processing apparatus including a calculator that calculates a three-dimensional position of a feature point on the basis of each of images obtained by imaging a subject at a first timing by a plurality of cameras and an external parameter of the plurality of cameras, the feature point being included in each of the images, a first estimator that estimates a first external parameter on the basis of one image included in the images obtained by imaging the subject at a second timing by the plurality of cameras and the three-dimensional position of the feature point, the first external parameter being an external parameter of a camera that has captured the one image among the plurality of cameras at the second timing, a second estimator that estimates a second external parameter that is an external parameter of any one camera of the plurality of cameras at the first timing on the basis of the first external parameter estimated by the first estimator, and a determiner that determines whether or not a deviation related to the external parameter has occurred in the plurality of cameras on the basis of the second external parameter of any one camera of the plurality of cameras and a previous external parameter of the any one camera, the second external parameter having been estimated by the second estimator.

In addition, the present disclosure can provide an information processing method executed by a computer, the method including calculating a three-dimensional position of a feature point on the basis of each of images obtained by imaging a subject at a first timing by a plurality of cameras and an external parameter of the plurality of cameras, the feature point being included in each of the images, estimating a first external parameter on the basis of one image included in the images obtained by imaging the subject at a second timing by the plurality of cameras and the three-dimensional position of the feature point, the first external parameter being an external parameter of a camera that has captured the one image among the plurality of cameras at the second timing, estimating a second external parameter that is an external parameter of any one camera of the plurality of cameras at the first timing on the basis of the first external parameter estimated by the first estimator, and determining whether or not a deviation related to the external parameter has occurred in the plurality of cameras on the basis of the second external parameter of any one camera of the plurality of cameras and a previous external parameter of the any one camera, the second external parameter having been estimated by the second estimator.

Furthermore, the present disclosure can provide a program causing a computer to implement a calculation function that calculates a three-dimensional position of a feature point on the basis of each of images obtained by imaging a subject at a first timing by a plurality of cameras and an external parameter of the plurality of cameras, the feature point being included in each of the images, a first estimation function that estimates a first external parameter on the basis of one image included in the images obtained by imaging the subject at a second timing by the plurality of cameras and the three-dimensional position of the feature point, the first external parameter being an external parameter of a camera that has captured the one image among the plurality of cameras at the second timing, a second estimation function that estimates a second external parameter that is an external parameter of any one camera of the plurality of cameras at the first timing on the basis of the first external parameter estimated by the first estimation function, and a determination function that determines whether or not a deviation related to the external parameter has occurred in the plurality of cameras on the basis of the second external parameter of any one camera of the plurality of cameras and a previous external parameter of the any one camera, the second external parameter having been estimated by the second estimation function.

MODE FOR CARRYING OUT THE INVENTION

Hereinafter, preferred embodiments of the present disclosure will be described in detail with reference to the accompanying drawings. Note that, in this specification and the drawings, components having substantially the same functional configuration are denoted by the same reference signs, and redundant explanations are omitted.

Furthermore, the "mode for carrying out the invention" is described in the order of items described below.
 1. Outline of information processing system
 2. Functional configuration example of information processing apparatus 30
 3. Review of problems
 4. Example of operation processing
  4.1. Entire operation
  4.2. Example of capturing image
  4.3. Example of image processing
  4.4. Detection of feature points by Harris' method
  4.5. Discrimination of set of feature points
  4.6. Determination as to whether or not image group is suitable for determination processing
  4.7. Determination of deviation in camera
 5. Example of operations and effects
 6. Hardware configuration example
 7. Supplement 1. Outline of Information Processing System As an embodiment of the present disclosure, a mechanism for detecting whether or not a deviation related to a camera parameter has occurred in a plurality of cameras on the basis of each image obtained by imaging by the plurality of cameras will be described.

Figure 1:
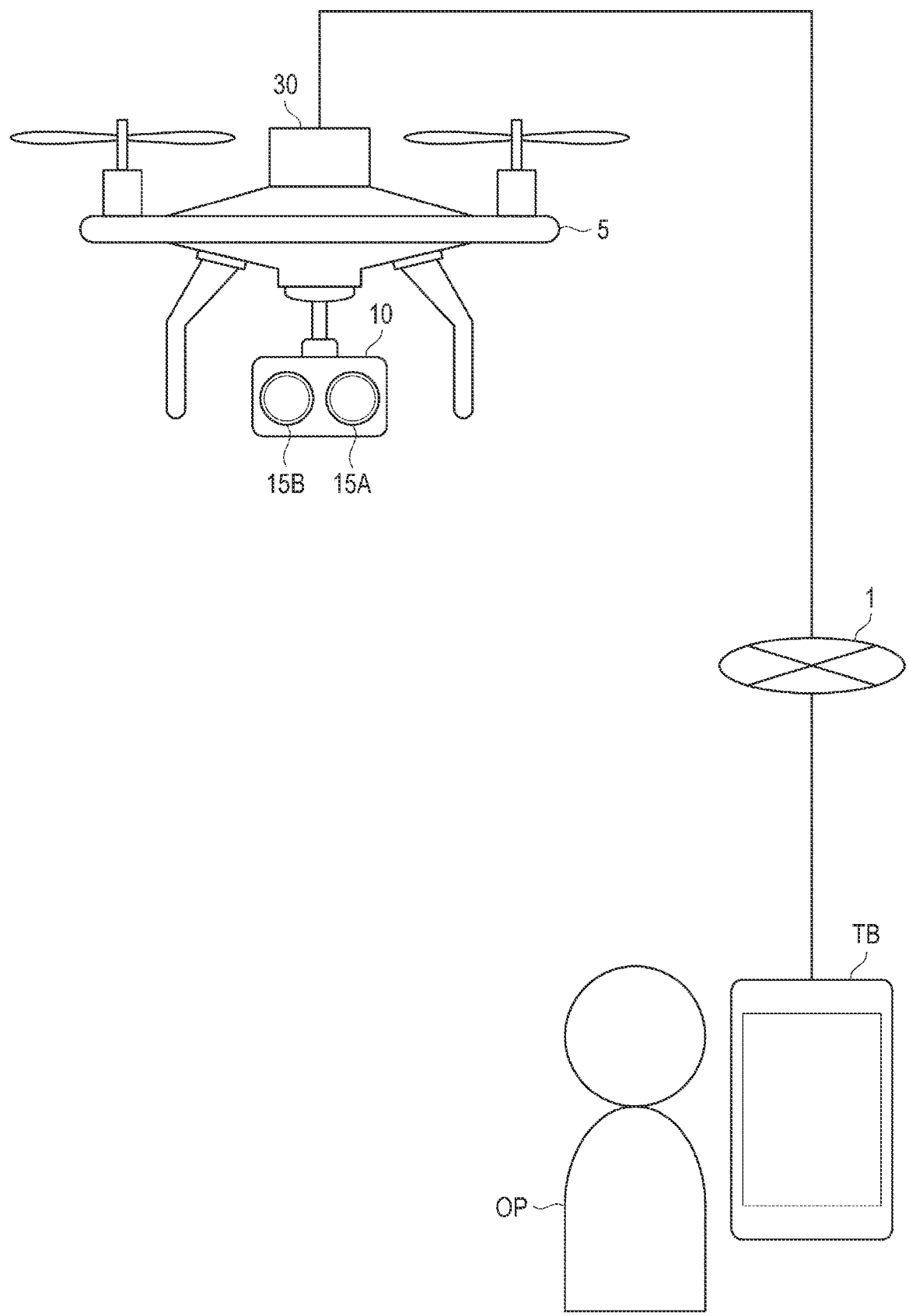
FIG. 1 is an explanatory diagram for describing an example of an information processing system according to the present disclosure.

FIG. 1 is an explanatory diagram for describing an example of an information processing system according to the present disclosure. The information processing system according to the present disclosure includes a network 1, a mobile body 5, a stereo camera 10, an information processing apparatus 30, and an information terminal TB.

(Network 1)

The network 1 is a wired or wireless transmission line for information that is transmitted from an apparatus connected to the network 1. For example, the network 1 may include public line networks such as the Internet, a telephone line network, and a satellite communication network, and various local area networks (LANs) including Ethernet (registered trademark) and a wide area network (WAN). Furthermore, the network 1 may include a dedicated line network such as an Internet protocol-virtual private network (IP-VPN).

The information terminal TB and the information processing apparatus 30 are connected via the network 1.

(Mobile Body 5)

The mobile body 5 is a device that moves by autonomous control or operation by a user. The mobile body 5 may be, for example, a drone as illustrated in FIG. 1. Furthermore, the mobile body 5 may be, for example, a vehicle, a ship, or an aircraft.

{Stereo Camera 10}

The stereo camera 10 images a subject and acquires an image. Furthermore, the stereo camera 10 acquires information in a depth direction of the subject by mounting two cameras side by side. In the following description, among the two cameras mounted on the stereo camera 10, the camera mounted on the left side facing the subject is referred to as a left camera 15A, and the camera mounted on the right side facing the subject is referred to as a right camera 15B. Note that, in the following description, the left camera 15A and the right camera 15B may be collectively referred to as the stereo camera 10 in a case where it is not necessary to distinguish them.

Furthermore, in this specification, two cameras of the left camera 15A and the right camera 15B will be described as a plurality of cameras mounted on the mobile body 5, but the number of cameras mounted on the mobile body 5 is not limited to such an example. For example, the number of cameras mounted on the mobile body 5 may be three or more.

{Information Processing Apparatus 30}

The information processing apparatus 30 estimates an external parameter of the left camera 15A or the right camera 15B on the basis of each image obtained by imaging the subject at a plurality of timings by the stereo camera 10. Furthermore, the information processing apparatus 30 determines whether or not a deviation related to an external parameter has occurred in the left camera 15A or the right camera 15B on the basis of the estimated external parameter and an external parameter at the time of the previous setting. That is, it is determined whether or not there is a deviation between the actual installation position or orientation of the left camera 15A or the right camera 15B and the installation position or posture corresponding to the set external parameter.

(Information Terminal TB)

The information terminal TB is a terminal used by a user OP. The information terminal TB may be, for example, a tablet terminal as illustrated in FIG. 1 or various devices such as a smartphone and a personal computer (PC).

For example, a display included in the information terminal TB displays a video obtained by imaging by the stereo camera 10. In addition, the information terminal TB performs a remote operation of the mobile body 5 on the basis of an operation by the user OP.

The outline of the information processing system according to the present disclosure has been described above. Next, a functional configuration example of the information processing apparatus 30 according to the present disclosure will be described below with reference to FIG. 2.

2. Functional Configuration Example of Information Processing Apparatus 30

Figure 2:
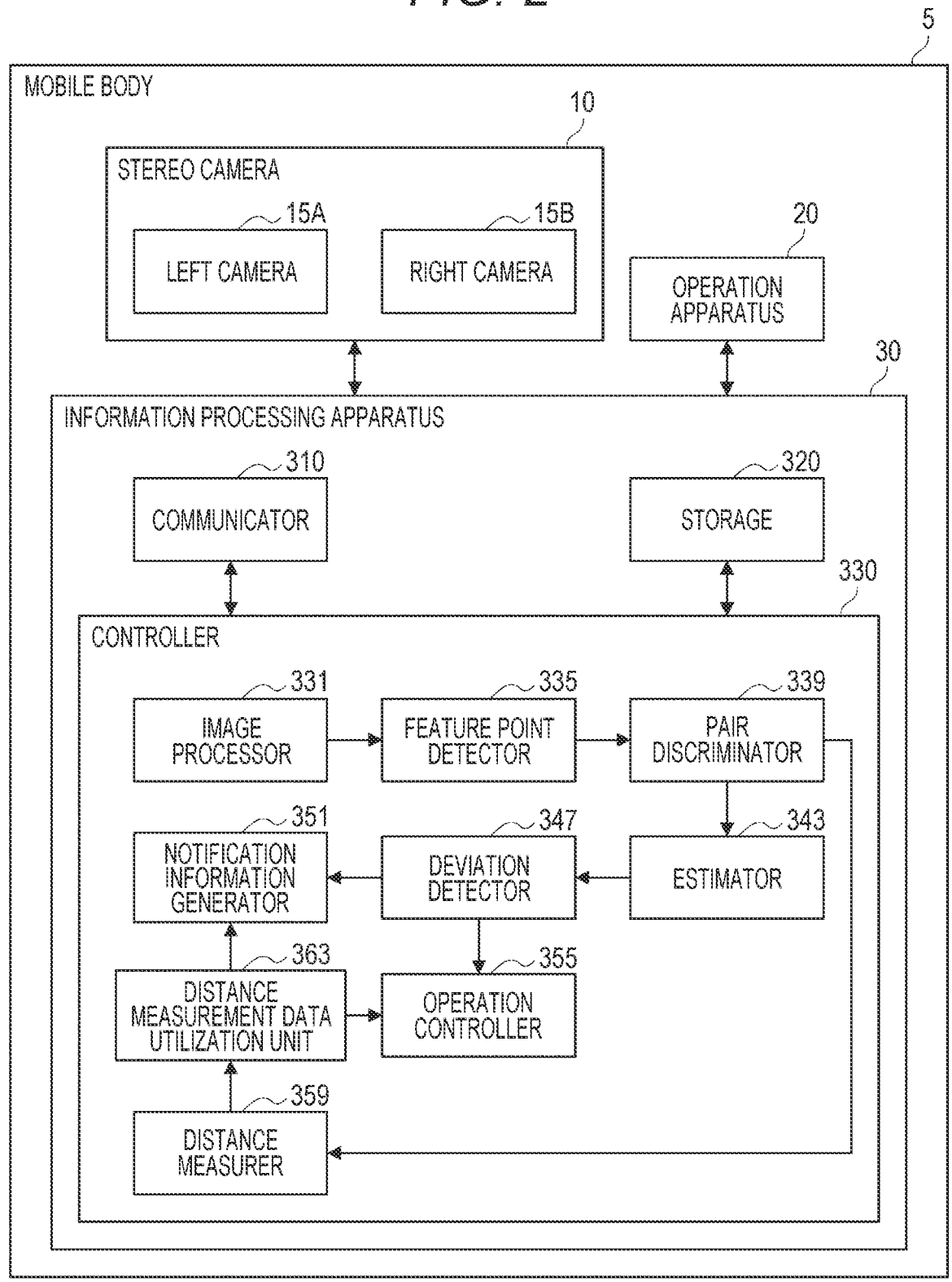
FIG. 2 is an explanatory diagram for describing a functional configuration example of an information processing apparatus 30 according to the present disclosure.

FIG. 2 is an explanatory diagram for describing the functional configuration example of the information processing apparatus 30 according to the present disclosure. As illustrated in FIG. 2, the mobile body 5 includes the stereo camera 10, an operation apparatus 20, and the information processing apparatus 30. Since the functional configuration of the stereo camera 10 has been described with reference to FIG. 1, will not be described in FIG. 2.

(Operation Apparatus 20)

The operation apparatus 20 is an apparatus that operates under control of an operation controller 355 described below. The operation apparatus 20 includes, for example, an engine, a braking device, and the like. A specific example of the operation of the operation apparatus 20 will be described later.

(Information Processing Apparatus 30)

As illustrated in FIG. 2, the information processing apparatus 30 according to the present disclosure includes a communicator 310, a storage 320, and a controller 330.

(Communicator 310)

The communicator 310 performs various communications with the information terminal TB. For example, the communicator 310 receives operation information of the mobile body 5 from the information terminal TB. Furthermore, the communicator 310 transmits notification information generated by a notification information generator 351 described later to the information terminal TB.

{Storage 320}

The storage 320 holds software and various data. For example, the storage 320 stores a provisional determination result determined by a deviation detector 347. In addition, the storage 320 may delete the stored provisional determination results in order from the oldest determination result when the number of the stored provisional determination results exceeds a predetermined number.

{Controller 330}

The controller 330 controls the overall operation of the information processing apparatus 30 according to the present disclosure. As illustrated in FIG. 2, the controller 330 according to the present disclosure includes an image processor 331, a feature point detector 335, a pair discriminator 339, an estimator 343, the deviation detector 347, the notification information generator 351, the operation controller 355, a distance measurer 359, and a distance measurement data utilization unit 363.

The image processor 331 executes image processing on each image acquired by the stereo camera 10. For example, the image processor 331 executes various types of image processing such as shading correction and noise reduction on each image.

Furthermore, the image processor 331 executes various processing such as lens distortion removal, rectification processing, and cropping processing.

The feature point detector 335 detects a feature point from each image obtained by imaging a subject by the stereo camera 10 at certain timings.

For example, the feature point detector 335 may detect a feature point from each image by using a known technique such as Harris' method or scale invariant feature transform (SIFT). Note that, in this specification, as an example of a method for detecting feature points from images by the feature point detector 335, a method for detecting feature points by using Harris' method will be described below.

The pair discriminator 339 is an example of a discriminator, and discriminates a feature point having the highest correlation degree of each feature point included in another image with respect to a feature point included in each image obtained by imaging the subject by the stereo camera 10 at a certain timing as a set of feature points.

The estimator 343 is an example of a calculator, and calculates a three-dimensional position of the feature point included in each image on the basis of each image obtained by imaging the subject by the stereo camera 10 at a certain timing and the external parameters of the plurality of cameras.

In addition, the estimator 343 is an example of a first estimator, and on the basis of one image included in images obtained by imaging the subject by the stereo camera 10 at a second timing and the three-dimensional position of the calculated feature point, the estimator 343 estimates, as a first external parameter, an external parameter of a camera that has captured one image among the stereo cameras 10 at another timing.

Furthermore, the estimator 343 is an example of a second estimator, and estimates the external parameter of the left camera 15A or the right camera 15B at the first timing described above as a second external parameter on the basis of the estimated first external parameter.

The deviation detector 347 is an example of a determiner, and determines whether or not a deviation related to the external parameter has occurred in the left camera 15A or the right camera 15B on the basis of the estimated external parameter of the left camera 15A or the right camera 15B and the external parameter at the time of the previous setting of the camera.

The notification information generator 351 is an example of a notifier, and when the deviation detector 347 determines that a deviation related to the external parameter has occurred in the left camera 15A or the right camera 15B, the notification information generator 351 generates notification information related to the deviation. In addition, the notification information generator 351 causes the communicator 310 to transmit the generated notification information to the information terminal TB of the user OP. A specific example of the notification information will be described later.

When the deviation detector 347 determines that a deviation related to an external parameter has occurred in the left camera 15A or the right camera 15B, the operation controller 355 performs control related to a predetermined operation of the mobile body 5 on which the stereo camera 10 is mounted. For example, the operation controller 355 may control the operation apparatus 20 such as an engine to limit a speed of the mobile body when the deviation detector 347 determines that a deviation related to the external parameter has occurred in the left camera 15A or the right camera 15B.

Furthermore, the operation controller 159 may control the operation apparatus 20 via a control device that controls the overall operation of the mobile body 5.

In addition, the operation controller 159 may control the operation apparatus 20 on the basis of various types of information obtained by the distance measurement data utilization unit 363. For example, in a case where the distance measurement data utilization unit 363 determines that a possibility of collision with an object is high, the operation controller 159 may control the braking device to stop the mobile body 5.

The distance measurer 359 executes distance measurement processing of calculating a distance from the stereo camera 10 to the subject on the basis of each image captured by the stereo camera 10 and a camera parameter. The distance measurement processing according to the present disclosure may use a known technique such as the principle of triangulation.

The distance measurement data utilization unit 363 uses distance measurement information calculated by the distance measurer 359. For example, the distance measurement data utilization unit 363 may determine the possibility of collision between the mobile body 5 on which the stereo camera 10 is mounted and the object on the basis of the calculated distance measurement information.

The functional configuration example of the information processing apparatus 30 according to the present disclosure has been described above. Next, problems according to the present disclosure will be described in detail.

3. Review of Problems

Various operation policies such as autonomous movement and movement by the operation by the user OP can be applied to the mobile body 5. In any operation policy, in order to reduce the possibility that the mobile body 5 collides with an object such as an obstacle or an animal during traveling, it is desirable to estimate the distance from the mobile body 5 to the object.

Here, a method using the principle of triangulation will be described as an example of estimating the distance from the mobile body 5 to the object with reference to FIG. 3.

Figure 3:
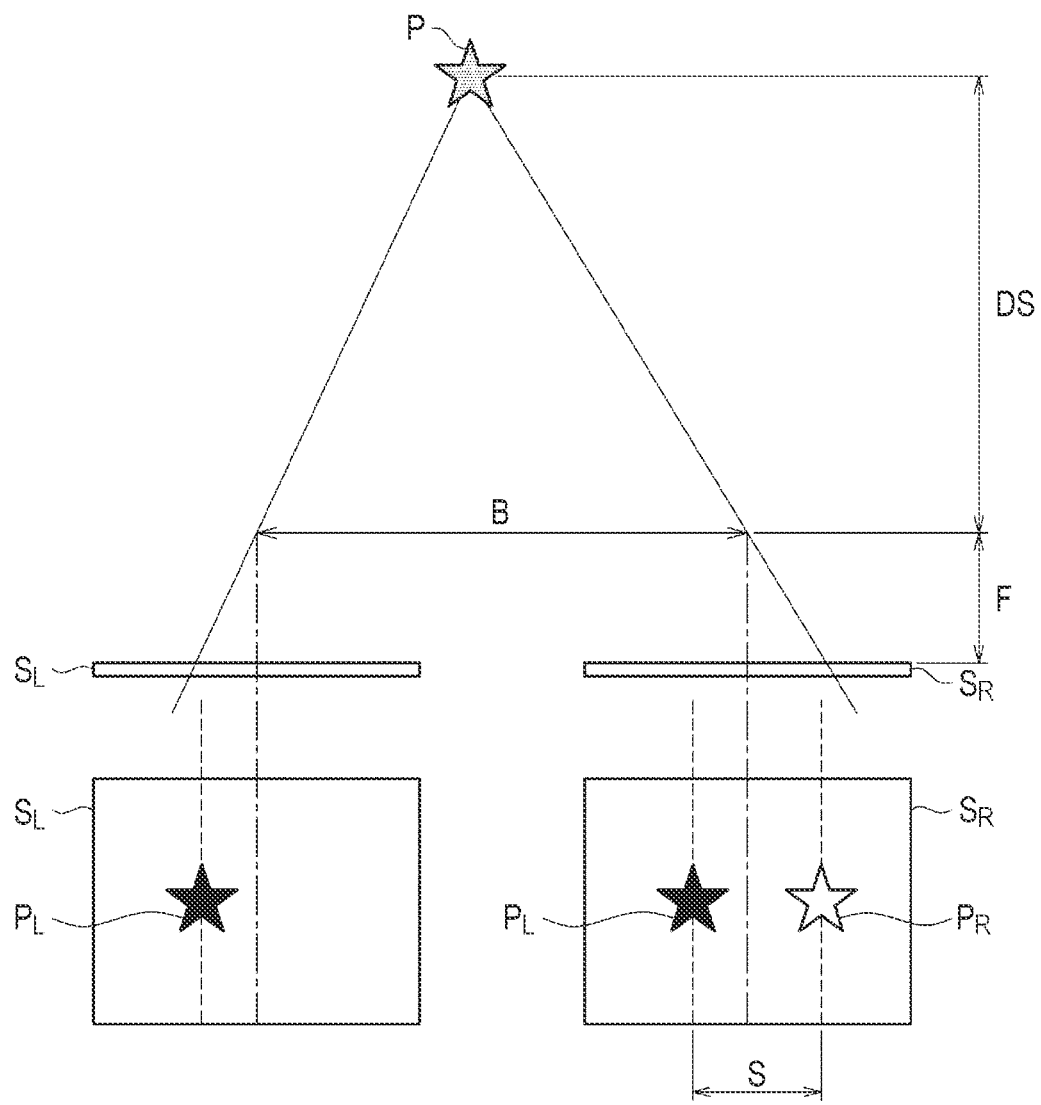
FIG. 3 is an explanatory diagram for describing an example of distance measurement processing using the principle of triangulation.

FIG. 3 is an explanatory diagram for describing an example of the distance measurement processing using the principle of triangulation. FIG. 3 illustrates image positions of a subject P on an image plane $S_L$ of the left camera 15A and on an image plane $S_R$ of the right camera 15B in a case where the subject P is imaged with the left camera 15A and the right camera 15B.

An image position $P_L$ is a position where the subject P is imaged on the image plane $S_L$ of the left camera 15A in a case where the left camera 15A images the subject P. In addition, an image position $P_R$ is a position where the subject P is imaged on the image plane $S_R$ of the right camera 15B in a case where the right camera 15B images the subject P at the same timing as the left camera 15A.

Furthermore, a difference between the image position $P_L$ of the subject P in the left camera 15A and the image position $P_R$ of the subject P in the right camera 15B is referred to as a disparity S. Note that the image position $P_L$ on the image plane $S_R$ in FIG. 3 is illustrated as an auxiliary for describing the disparity S.

Here, by using a base length B, a focal length F, and the disparity S, a distance DS is represented by the following formula (Equation 1).

[Math. 1]
$$DS = B \times \frac{F}{S} \quad \text{(Equation 1)}$$

As described above, the disparity S is used for calculating the distance DS as shown in the formula (Equation 1). For example, the disparity S decreases as the distance from the stereo camera 10 to the subject P increases, and increases as the distance decreases.

In addition, the disparity S is a difference between the image position $P_L$ of the subject P in the left camera 15A and the image position $P_R$ of the subject P in the right camera 15B, and the image position $P_L$ and the image position $P_R$ depend on the external parameters set on the basis of the positions and orientations of the left camera 15A and the right camera 15B.

On the other hand, for example, there is no guarantee that the external parameter set at a certain past timing is also necessarily accurate at the present time. For example, there is a possibility that the position and orientation of the left camera 15A or the right camera 15B change due to the influence of disturbance caused by vibration or temperature change. When the position or orientation changes, the accuracy of the external parameter set on the basis of the original position or orientation of the left camera 15A or the right camera 15B is also reduced.

As a result of the decrease in the accuracy of the external parameters, the value of the disparity S is not an accurate value, and thus the estimation accuracy of the distance DS by the distance measurer 359 can also be reduced. Therefore, it is desirable to periodically detect whether or not a deviation related to the external parameter has occurred in the left camera 15A or the right camera 15B.

Furthermore, in a case where a linear direction connecting the centers of the left camera 15A and the right camera 15B is an x direction, and a direction perpendicular to the x direction is a y direction, a change in the positions and orientations of the left camera 15A and the right camera 15B, for example, a deviation in the y direction, can be easily detected by the rectification processing described later. On the other hand, a deviation in the x direction is hard to detect only from an image.

Therefore, the information processing apparatus 30 according to the present disclosure determines whether or not a deviation related to an external parameter has occurred in the left camera 15A or the right camera 15B on the basis of an image group obtained by imaging a subject. Note that the deviation related to the external parameter includes, for example, a deviation in an attachment angle or a deviation in an attachment position of the left camera 15A or the right camera 15B.

Hereinafter, examples of operation processing in which the information processing apparatus 30 according to the present disclosure determines whether or not a deviation related to an external parameter of the stereo camera 10 has occurred will be sequentially described in detail with reference to FIGS. 4 to 13.

4. Example of Operation Processing

4.1. Entire Operation

Figure 4:
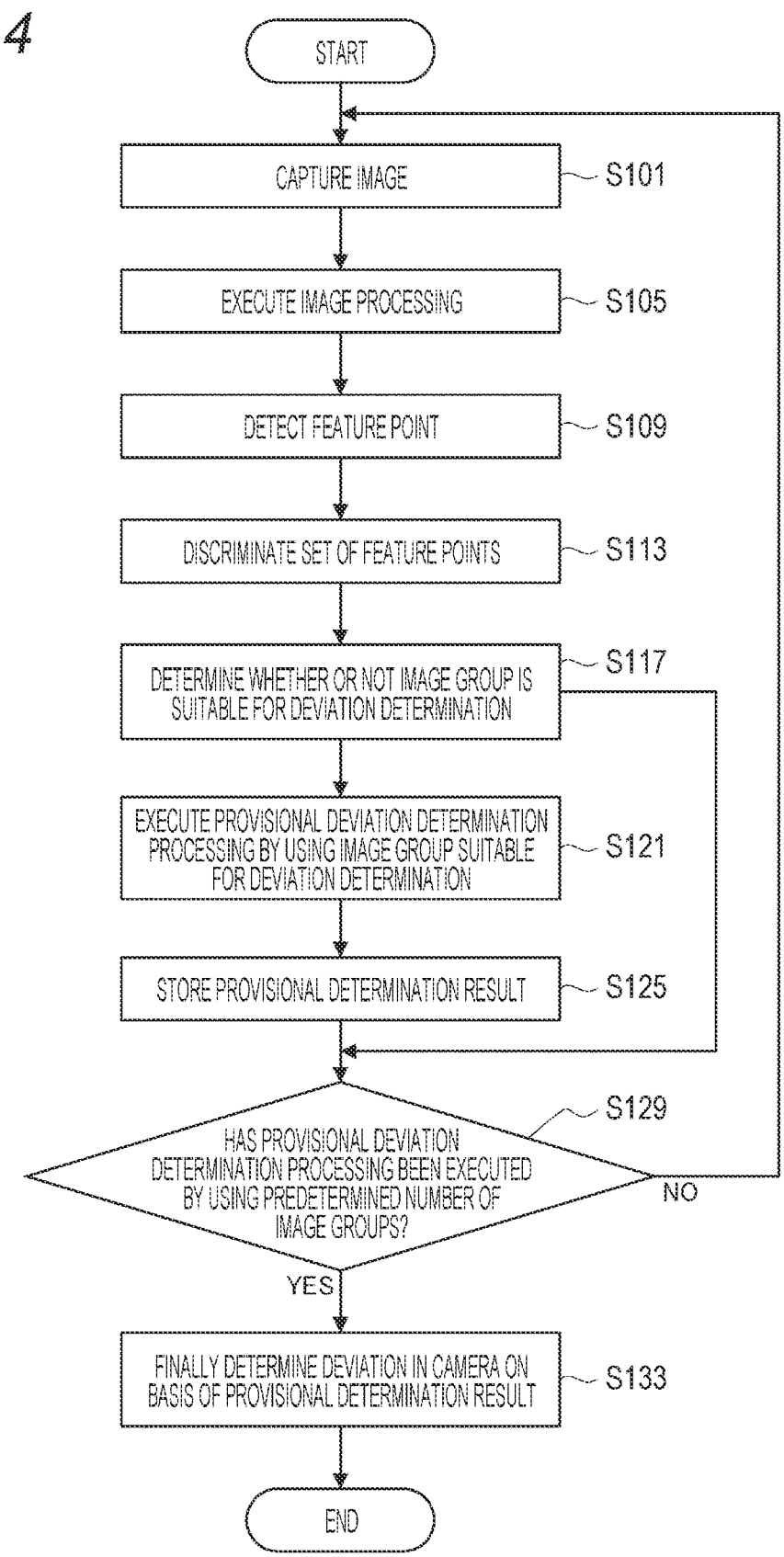
FIG. 4 is an explanatory diagram for describing an example of operation processing of the information processing apparatus 30 according to the present disclosure.

FIG. 4 is an explanatory diagram for describing an example of the operation processing of the information processing apparatus 30 according to the present disclosure. First, the stereo camera 10 images a subject and acquires an image group including a plurality of images (S101).

Next, the image processor 331 executes image processing on each image obtained by imaging by the stereo camera 110 (S105).

Thereafter, the feature point detector 335 detects a feature point from each image (S109).

Then, the pair discriminator 339 discriminates a set of feature points having a high correlation degree between each feature point detected from one image and each feature point detected from another image (S113).

Then, the estimator 343 determines whether or not the image group obtained by capturing by the stereo camera 10 includes images suitable for deviation determination (S117).

Subsequently, the deviation detector 347 uses the image group suitable for the deviation determination to execute provisional deviation determination processing (S121).

Then, the storage 320 stores a provisional determination result of the deviation (S125).

Thereafter, the controller 330 determines whether or not the provisional deviation determination processing has been executed by using a predetermined number of image groups (3129). In a case where the deviation provisional determination processing is executed by using the predetermined number of image groups (S129/Yes), the processing proceeds to 3133, and in a case where the provisional deviation determination processing is not executed by using the predetermined number of image groups (S129/No), the processing proceeds to S101.

In a case where the provisional deviation determination processing is executed by using the predetermined number of image groups (S129/Yes), the deviation detector 347 determines whether or not the deviation related to the external parameter has occurred in the left camera 15A or the right camera 15B on the basis of the provisional determination result of each deviation (S133), and the information processing apparatus 30 according to the present disclosure ends the processing.

An example of entire operation processing of the information processing apparatus 30 according to the present disclosure has been described above. Next, specific examples of operation processing related to S101 to 3133 will be sequentially described. First, an example of capturing an image by the stereo camera 10 according to the present disclosure will be described with reference to FIG. 5.

4.2. Example of Capturing Image

Figure 5:
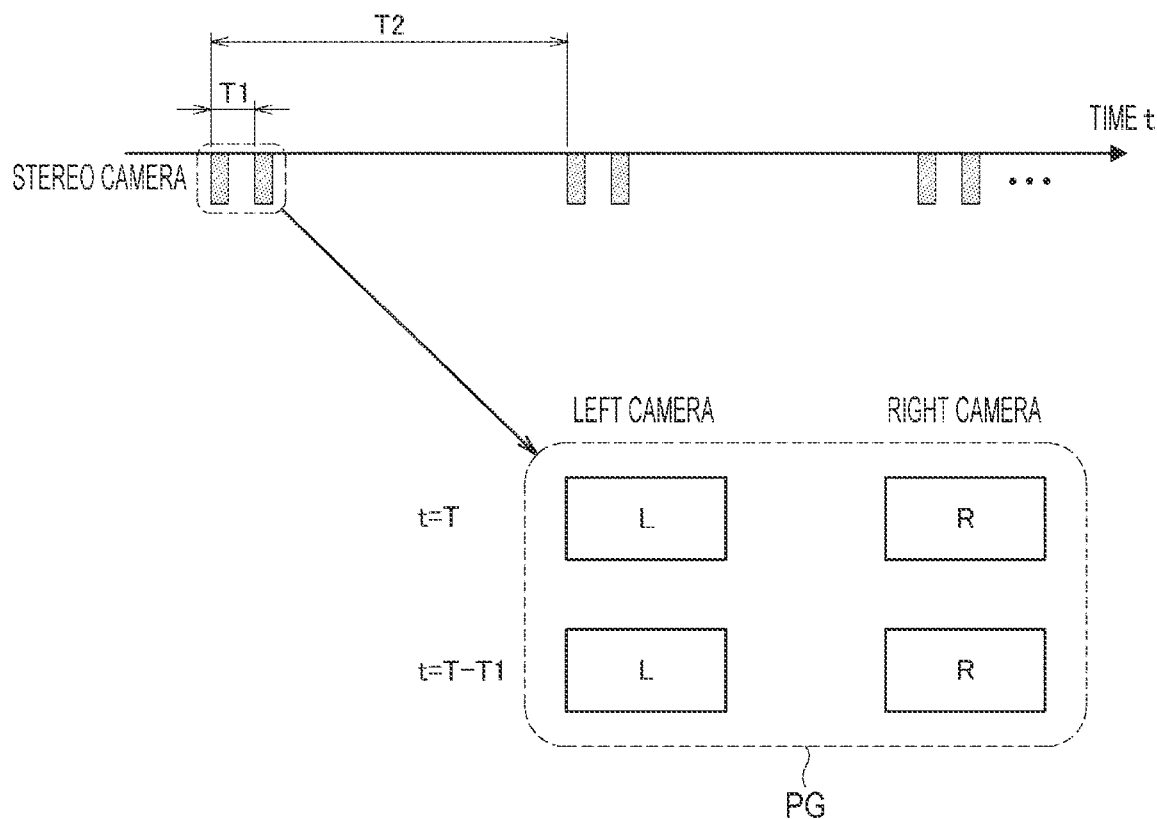
FIG. 5 is an explanatory diagram for describing an example of capturing an image by a stereo camera 10 according to the present disclosure.

FIG. 5 is an explanatory diagram for describing an example of capturing an image by the stereo camera 10 according to the present disclosure. The stereo camera 10 according to the present disclosure captures images at intervals of a time width T1. For example, the time width T1 may be set to such an extent (for example, T1=0.2 seconds) that a motion amount of the feature point of each image can be detected while including an overlap of the subject. Images obtained by imaging at the interval of such a time width T1 may be expressed as an image group PG. Note that, in FIG. 5, the stereo camera 10 captures images twice at the interval of the time width T1, and images obtained by the two captures are set as one image group PG, but the stereo camera 10 may capture images three or more times at the intervals of the time width T1. In this case, images obtained in accordance with the number of times is set as one image group PG.

Furthermore, the stereo camera 10 may acquire the image group PG by imaging at intervals of a time width T2. For example, the stereo camera 10 may acquire images while changing the subject at the intervals of the time width T2 (for example, 10 to 60 seconds). Although details will be described later, the image group PG is acquired for every time width T2, and the provisional deviation determination processing is executed by using each of the image groups PG obtained for every time width T2.

Furthermore, in the present specification, an example in which the mobile body 5 includes one stereo camera 10 will be mainly described, but the mobile body 5 may include a plurality of stereo cameras 10. In a case where the mobile body 5 includes the plurality of stereo cameras 10, the controller 330 may control image timing of the plurality of stereo cameras 10 by, for example, a round robin method.

An example of capturing an image by the stereo camera 10 according to the present disclosure has been described above. Next, an example of operation processing related to the image processing according to the present disclosure will be described with reference to FIG. 6.

4.3. Example of Image Processing

Figure 6:
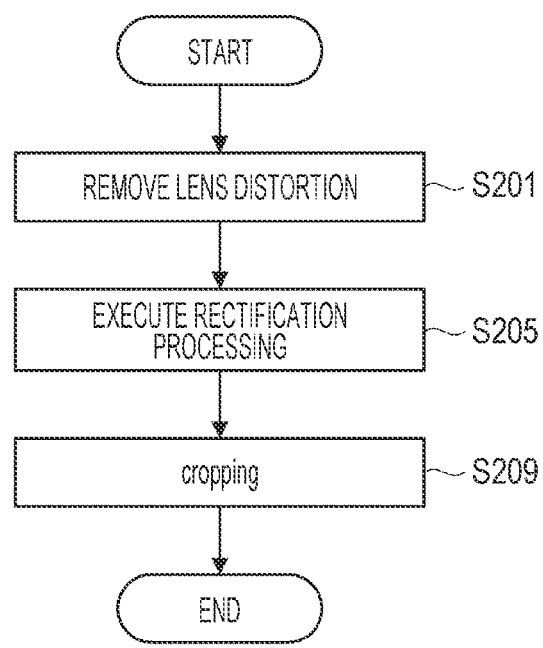
FIG. 6 is an explanatory diagram for describing an example of operation processing related to image processing according to the present disclosure.

FIG. 6 is an explanatory diagram for describing an example of the operation processing related to the image processing according to the present disclosure. First, the image processor 331 uses the camera parameter of the stereo camera 10 to remove lens distortion in each image obtained by capturing by the stereo camera 10 (S201).

Next, the image processor 331 executes the rectification processing on each image obtained by capturing by the stereo camera 10 (S205). Note that the rectification processing is processing of aligning the image positions of a certain subject in the y direction in each image obtained by imaging the subject with the stereo camera 10. Note that a linear direction connecting the centers of the left camera 15A and the right camera 15B is the x direction, and a direction perpendicular to the x direction is the y direction.

Then, the image processor 331 cuts the image subjected to the lens distortion removal and the rectification processing into a desired image size by the cropping processing (S209), and the image processor 331 according to the present disclosure ends the processing related to the image processing.

An example of the operation processing related to the image processing according to the present disclosure has been described above. Next, an example of operation processing related to detection of feature points according to the present disclosure will be described with reference to FIG. 7.

4.4. Detection of Feature Points by Harris' Method

Figure 7:
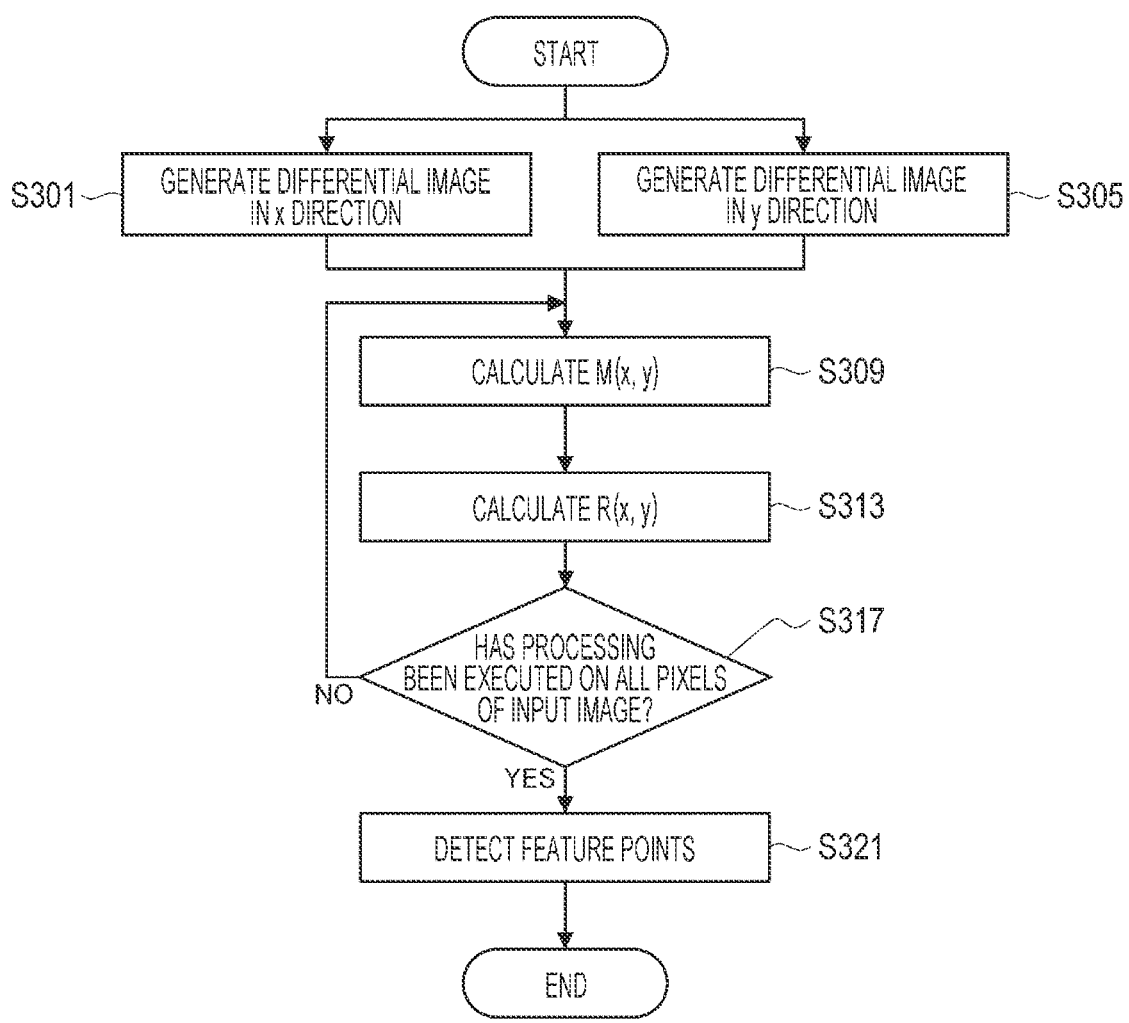
FIG. 7 is an explanatory diagram for describing an example of a method for detecting feature points by Harris' method.

FIG. 7 is an explanatory diagram for describing an example of a method for detecting feature points by Harris' method. First, the feature point detector 335 generates a differential image in the x direction from each input image (S301).

Furthermore, the feature point detector 335 generates a differential image in the y direction from each input image (S305). Note that the feature point detector 335 may generate a differential image in the x direction and a differential image in the y direction, for example, by applying a Sobel filter for the x direction and the y direction to each input image.

Then, the feature point detector 335 calculates a matrix M(x, y) by a pixel value at the same pixel position in the differential image in each of the directions and the following formula (Equation 2) (S309).

[Math. 2]

$$M(x, y) = \sum_{u,v} g(u, v) \begin{bmatrix} IxIx & IxIy \\ IxIy & IyIy \end{bmatrix}$$ (Equation 2)

Note that g(u, v) is a weighting factor, and may be, for example, a Gaussian function with x, y as the origin. Furthermore, Ix is a pixel value of the differential image in the x direction, and $I_y$ is a pixel value of the differential image in the y direction.

Next, the feature point detector 335 calculates a feature value R(x, y) of a pixel (x, y) by the matrix M(x, y) and the following formula (Equation 3) (S313).

[Math. 3]

$$R(x,y) = \det M(x,y) - k(\text{tr}M)^2$$ (Equation 3)

Note that detM(x, y) is the value of the determinant of the matrix M(x, y), and trM is the trace of the matrix M(x, y). Furthermore, k is a parameter designated by a user, and is designated in a range of, for example, 0.04 to 0.06.

Then, the feature point detector 335 executes processing of S309 to S313 on all the pixels of the input image (S317). Hence, in a case where the processing related to S309 and S313 has not been executed on all the pixels of the input image (S317/No), the processing returns to S309, and in a case where the processing related to S309 and S313 has been executed on all the pixels of the input image (S317/Yes), the processing proceeds to S321.

Then, the feature point detector 335 detects feature points on the basis of each of the feature values R(x, y) of all the pixels (S321).

For example, the feature point detector 335 detects, as a feature point (for example, a corner point) of the image, a position of a pixel having the maximum feature value R(x, y), the pixel being equal to or greater than a threshold designated by the user.

An example of the method for detecting feature points by Harris' method has been described. Next, an example of a method for discriminating a set of feature values according to the present disclosure will be described with reference to FIG. 8.

4.5. Discrimination of Set of Feature Points

Figure 8:
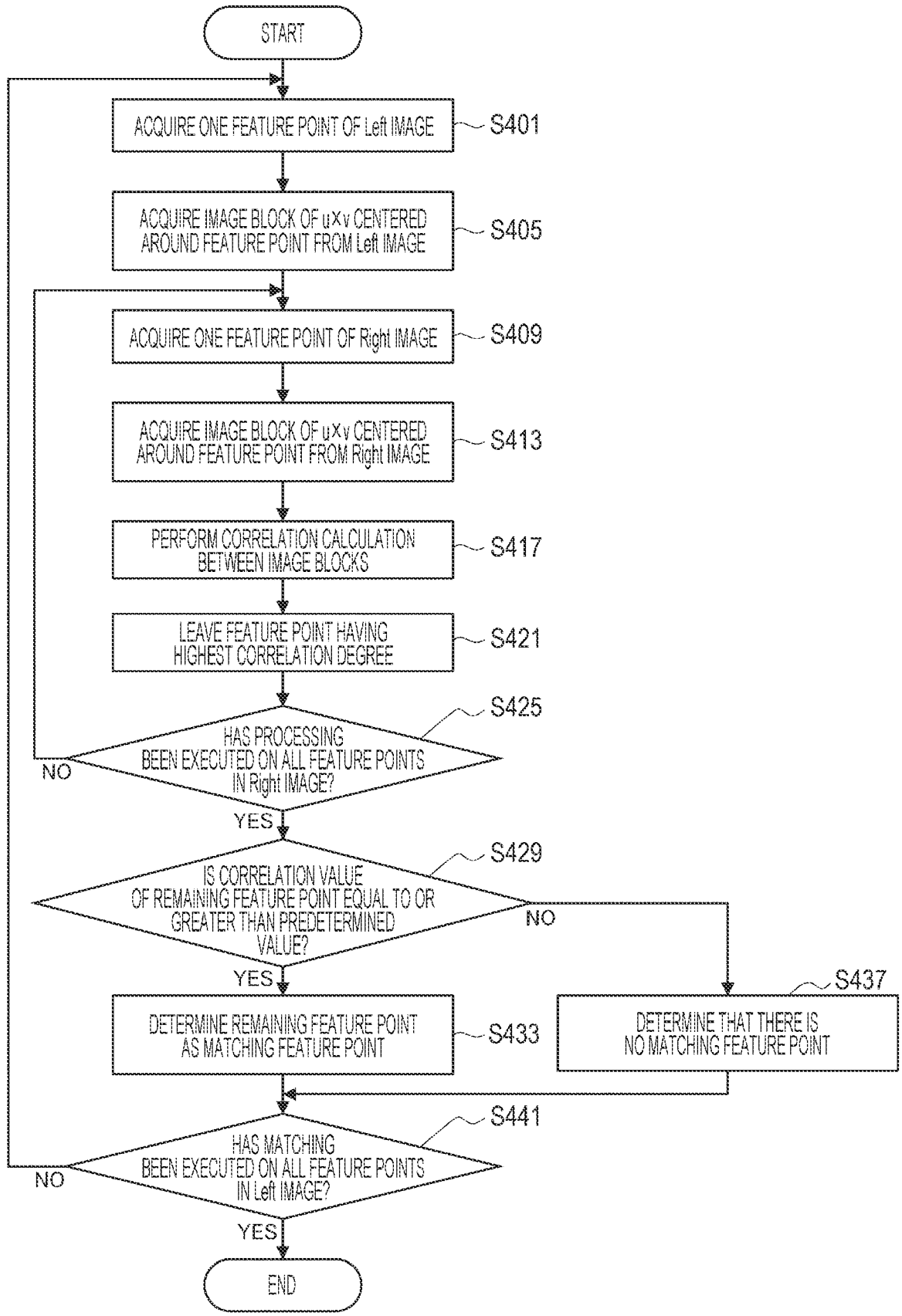
FIG. 8 is an explanatory diagram for describing an example of operation processing related to discrimination of a set of feature points according to the present disclosure.

FIG. 8 is an explanatory diagram for describing an example of operation processing related to discrimination of a set of feature points according to the present disclosure. In FIG. 8, an example of a method for discriminating a set of feature points from feature points included in each of two images by the pair discriminator 339 is described. In the following description, of the two images, an image obtained by imaging by the left camera 15A may be expressed as a Left image, and an image obtained by imaging by the right camera 15B may be expressed as a Right image.

First, the pair discriminator 339 acquires one feature point of the Left image (S401).

Next, the pair discriminator 339 acquires an image block of u×v set as the feature point from the Left image (S405).

Then, the pair discriminator 339 acquires one feature point of the Right image (S409).

Thereafter, the pair discriminator 339 acquires an image block of u×v centered around the feature point from the Right image (S413).

Next, the pair discriminator 339 performs a correlation calculation between the image block of the image block of Light and the image block of Right (S417).

For example, in the correlation calculation according to the present disclosure, the pair discriminator 339 may calculate the correlation degree of each feature point by using a known calculation method, but may calculate the correlation degree of each feature point by using any of, for example, the following formulae (Equation 4) to (Equation 7).

[Math. 4]

$$SSD(xl, yl, xr, yr) = \sum_{u,v} ((\overline{Il} - \overline{Ir}))^2$$ (Equation 4)

[Math. 5]

$$SAD(xl, yl, xr, yr) = \sum_{u,v} (\overline{Il} - \overline{Ir})^2$$ (Equation 5)

[Math. 6]

$$NCC(xl, yl, xr, yr) = \frac{\sum\sum((IlIr))}{\sqrt{\sum\sum Il\,l}\sqrt{\sum\sum Ir\,Ir}}$$ (Equation 6)

[Math. 7]

$$ZNCC(xl, yl, xr, yr) = \frac{\sum\sum((Il - AVE(Il))(Ir - AVE(Ir)))}{\sqrt{\sum\sum(Il - AVE(Il))^2}\sqrt{\sum\sum(Ir - AVE(Ir))^2}}$$ (Equation 7)

Note that AVE in (Equation 7) represents an average value. Here, a specific example of the correlation calculation according to the present disclosure will be described with reference to FIG. 9.

Figure 9:
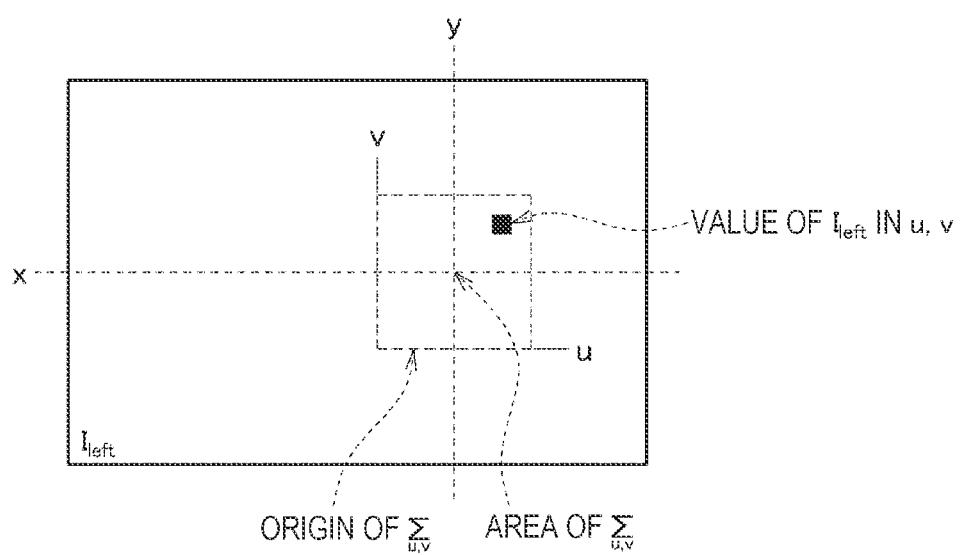
FIG. 9 is an explanatory diagram for describing a specific example of a correlation calculation according to the present disclosure.

FIG. 9 is an explanatory diagram for describing a specific example of the correlation calculation according to the present disclosure. The pair discriminator 339 acquires pixel values in the area of the u×v block having the certain feature point of the Left image as the origin.

Then, the pair discriminator 339 similarly acquires the area of the u×v block having a certain feature point as the origin in the Right image.

Then, the pair discriminator 339 calculates the correlation degree of a feature point by applying the Equations 4 to 7 to each pixel value $I_l$ in the u×v area of the Left image and each pixel value $I_R$ in the u×v area of the Right image.

A specific example of the correlation calculation according to the present disclosure has been described above. Referring back to FIG. 8, the description of the example of the operation processing related to the discrimination of a set of feature points will be continued.

After executing the correlation calculation between the feature points in the Left image and the feature points in the Right image (S417), the pair discriminator 339 leaves a feature point in the Right image, the feature point having the highest correlation degree with the feature point in the Left image acquired in S401, as a candidate for a set of feature points (S421).

Then, the pair discriminator 339 executes processing of S409 to S421 between the feature point in the Left image acquired in S401 and all feature points in the Right image (S425). Hence, in a case where all the feature points in the Right image have not been checked against the feature point in the Left image acquired in S401 (S425/No), the processing returns to S409, and in a case where all the feature points in the Right image have been checked (S425/Yes), the processing proceeds to S429.

In the case where all the feature points in the Right image have been checked (S425/Yes), the pair discriminator 339 determines whether or not a correlation value between the feature point in the Left image acquired in S401 and the last remaining feature point in the Right image in S421 is equal to or greater than a predetermined value (S429). In a case where the correlation value is less than the predetermined value (S429/No), the processing proceeds to S437, and in a case where the correlation value is equal to or greater than the predetermined value (S429/Yes), the processing proceeds to S433.

In a case where the correlation value is less than the predetermined value (S429/No), the pair discriminator 339 determines that there is no feature point in the Right image, the no feature point matching the feature point in the Left image acquired in S401, as a set of feature points (S437).

In a case where the correlation value is equal to or greater than the predetermined value (S429/Yes), the pair discriminator 339 discriminates the feature point in the Left image acquired in S401 and the last remaining feature point in the Right image in S421, as a set of feature points (S433).

Then, the pair discriminator 339 executes the processing related to the discrimination of a set of feature points in S401 to S437 on all feature points in the Left image (S441). Hence, in a case where the processing related to the discrimination of a set of feature points has not been executed on all the feature points in the Left image (S441/No), the processing returns to S401 again, and in a case where processing related to matching has been executed on all the feature points in the Left image (S441/Yes), the pair discriminator 339 according to the present disclosure ends the processing.

An example of the operation processing related to the discrimination of a set of feature points according to the present disclosure has been described above. Next, an example of operation processing of determining by the estimator 343 whether or not an image group is suitable for the deviation determination on the basis of feature points and sets of feature points is described with reference to FIG. 10.

Figure 10:
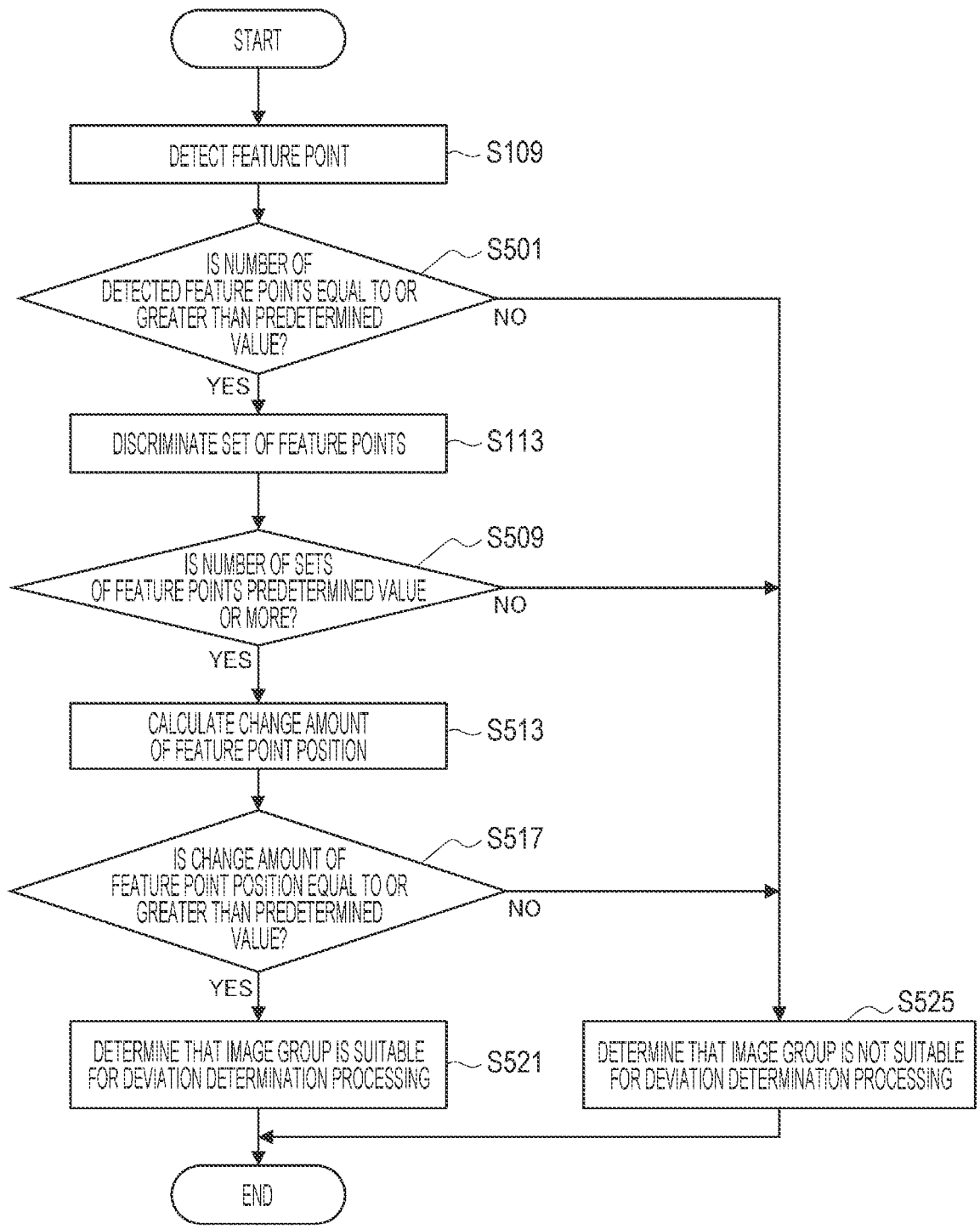
FIG. 10 is an explanatory diagram for describing an example of operation processing of determining whether or not an image group is suitable for deviation determination according to the present disclosure.

4.6. Determination as to Whether or not Image Group is Suitable for Determination Processing FIG. 10 is an explanatory diagram for describing an example of the operation processing of determining whether or not an image group is suitable for deviation determination according to the present disclosure. In order to improve determination accuracy of deviation determination processing, it is necessary that a set of feature points discriminated from each image indicate the same target position. On the other hand, the pair discriminator 339 does not necessarily discriminate feature points at the same target position as a set of feature points. Therefore, as the number of feature points detected by the feature point detector 335 and the number of sets of feature points discriminated by the pair discriminator 339 increase (that is, as the number of samples increases), the influence of erroneous discrimination of sets of feature points can be reduced.

FIG. 9 is an explanatory diagram for describing an example of the operation processing of determining whether or not an image group is suitable for the deviation determination processing according to the present disclosure. First, the feature point detector 335 detects a feature point from each image (S109).

Next, the estimator 343 determines whether or not the number of detected feature points is equal to or greater than a predetermined value (S501). In a case where the number of feature points is equal to or greater than the predetermined value (S501/Yes), the processing proceeds to S113, and in a case where the number of feature points is less than the predetermined value (S501/No), the processing proceeds to S525.

In a case where the number of feature points is equal to or greater than the predetermined value (S501/Yes), the pair discriminator 339 discriminates sets of feature points from each image (S113).

Then, in a case where the number of sets of feature points is a predetermined value or more (S509/Yes), the estimator 343 advances the processing to S513, and in a case where the number of sets of feature points is less than the predetermined value (S509/No), the estimator advances the processing to S525.

In a case where the number of sets of feature points is equal to or greater than the predetermined value (S509/Yes), the estimator 343 calculates a change amount of a feature point position between the images (S513).

Then, the estimator 343 determines whether or not the calculated change amount of the feature point position is equal to or greater than a predetermined value (S517). In a case where the change amount of the feature point position is equal to or greater than the predetermined value (S517/Yes), the processing proceeds to S521, and in a case where the change amount of the feature point position is less than the predetermined value (S517/No), the processing proceeds to S525. Note that, in a case where the mobile body 5 includes a sensor that acquires a motion amount, the change amount of the feature point position may be estimated on the basis of motion information of the mobile body 5 acquired by the sensor.

In a case where the change amount of the feature point position is the predetermined value or more (S517/Yes), the estimator 343 determines that the image group is suitable for the deviation determination processing (S521), and the information processing apparatus 30 according to the present disclosure ends the processing.

In a case where the number of feature points is less than the predetermined value (S501/No), in a case where the number of sets of feature points is less than the predetermined value (S509/No), or in a case where the change amount of the feature point position is less than the predetermined value (S517/No), the estimator 343 determines that the image group is not suitable for the deviation determination processing (S525), and the information processing apparatus 30 according to the present disclosure ends the processing.

An example of the operation processing of determining whether or not images are suitable for the calibration processing according to the present disclosure has been described. However, the method for determining whether or not images are suitable for the calibration processing according to the present disclosure is not limited to such an example.

For example, the estimator 343 may determine whether or not the image group is suitable for the deviation determination processing by combining one or two of the processings instead of executing every processing of S501, S509, and S517.

Furthermore, the estimator 343 may divide each image (for example, into four areas) and execute the processing of S501, S509, or S517 on each of the divided areas.

4.7. Determination of Deviation in Camera

The deviation determination processing according to the present disclosure includes two procedures of provisional determination processing and final determination processing. Details of the provisional determination and the final determination will be sequentially described below.

(Provisional Determination as to Whether or not Deviation has Occurred)

An example of a provisional method for determining whether or not a deviation according to the present disclosure has occurred will be described with reference to FIGS. 11A to 11C.

{First Step}

Figure 11A:
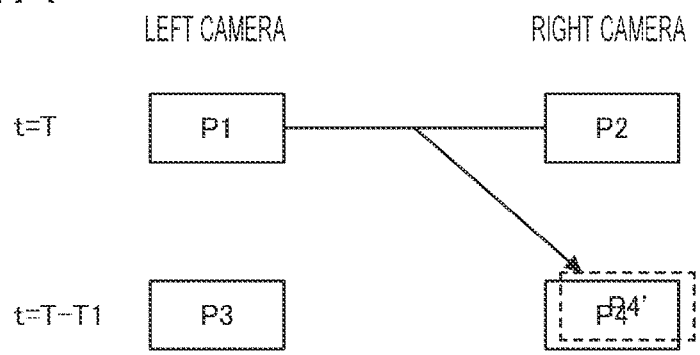
FIG. 11A is an explanatory diagram for describing an example of a first step of a provisional method for determining whether or not a deviation has occurred in the stereo camera 10 according to the present disclosure.

FIG. 11A is an explanatory diagram for describing an example of a first step of the provisional method for determining whether or not a deviation has occurred in the stereo camera 10 according to the present disclosure. First, the estimator 343 calculates the three-dimensional position of the feature point included in each image on the basis of each image captured by the left camera 15A and the right camera 15B at the timing of a time T, an external parameter P1 of the left camera 15A, and an external parameter P2 of the right camera 15B. Note that the feature points whose three-dimensional positions are calculated are each feature point discriminated as a set of feature points by the pair discriminator 339.

Then, the estimator 343 estimates an external parameter P4' of the right camera 15B at a time T-T1 as the first external parameter on the basis of the calculated three-dimensional position of the feature point and the feature point of an image obtained by imaging by the right camera 15B at the time T-T1.

{Second Step}

Figure 11B:
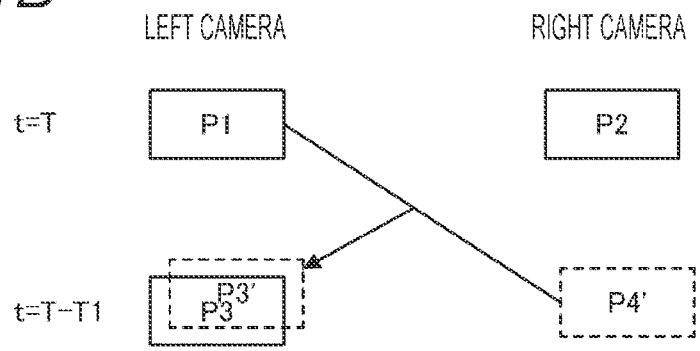
FIG. 11B is an explanatory diagram for describing an example of a second step of the provisional method for determining whether or not a deviation has occurred in the stereo camera 10 according to the present disclosure.

FIG. 11B is an explanatory diagram for describing an example of a second step of the provisional method for determining whether or not a deviation has occurred in the stereo camera 10 according to the present disclosure. Following the first step, on the basis of the image obtained by imaging by the left camera 15A at the timing of the time T, the image obtained by imaging by the right camera 15B at the timing of the time T-T1, the external parameter P1 of the left camera 15A, and the external parameter P4' of the right camera 15B, the estimator 343 calculates the three-dimensional position of the feature point included in each of the images.

Then, the estimator 343 estimates an external parameter P3' of the left camera 15A at the time T-T1 as the first external parameter on the basis of the calculated three-dimensional position of the feature point and the feature point of an image obtained by imaging by the left camera 15A at the time T-T1.

{Third Step}

Figure 11C:
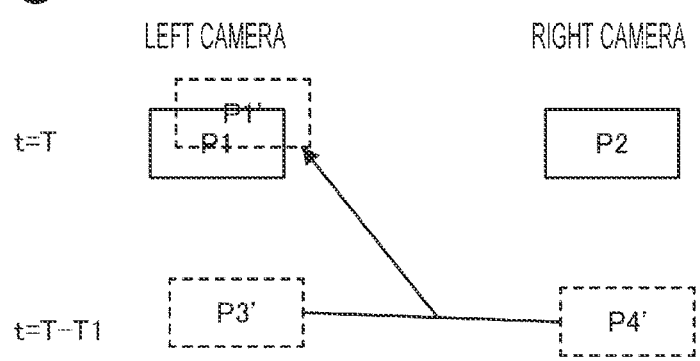
FIG. 11C is an explanatory diagram for describing an example of a third step of the provisional method for determining whether or not a deviation has occurred in the stereo camera 10 according to the present disclosure.

FIG. 11C is an explanatory diagram for describing an example of a third step of the provisional method for determining whether or not a deviation has occurred in the stereo camera 10 according to the present disclosure. Following the second step, on the basis of each image captured by the left camera 15A and the right camera 15B at the timing of a time T-1 and the external parameters P3' and P4' estimated as the first external parameters, the estimator 343 calculates the three-dimensional position of the feature point included in each image.

Then, the estimator 343 estimates an external parameter P1' of the left camera 15A at the time T as the second external parameter on the basis of the calculated three-dimensional position of the feature point and the feature point of the image obtained by imaging by the left camera 15A at the time T.

{Provisional Determination}

On the basis of the external parameter P1' obtained in the third step and the external parameter P1 at the time of the previous setting, the deviation detector 347 provisionally determines whether or not a deviation related to the external parameter has occurred in either the left camera 15A or the right camera 15B. For example, when a difference between the external parameter P1' and the external parameter P1 is equal to or greater than a predetermined value, the deviation detector 347 provisionally determines that the deviation related to the external parameter has occurred in either the left camera 15A or the right camera 15B. Note that the deviation related to the external parameter includes, for example, a deviation in the attachment angle or a deviation related to the attachment position of either the left camera 15A or the right camera 15B.

Although an example of the method for provisionally determining whether or not a deviation according to the present disclosure has occurred has been described above, the provisional deviation determination processing according to the present disclosure is not limited to such an example. For example, the estimator 343 estimates the external parameter P4' in the first step described above. Subsequently, the estimator 343 may estimate the external parameter P1' on the basis of the external parameter P2 and the external parameter P4'. As a result, the second step can be omitted, and the processing can be simplified.

In addition, the estimator 343 estimates the external parameter P3' and the external parameter P4' by the first step and the second step. Subsequently, the deviation detector 347 may compare the external parameter P1 and the external parameter P2 at the time of the previous setting with the external parameter P3' and the external parameter P4' estimated by the estimator 343, and determine whether or not a deviation related to the external parameter has occurred in either the left camera 15A or the right camera 15B. As a result, the third step can be omitted, and the processing can be simplified.

Furthermore, in FIGS. 11A to 11C, an example has been described in which the estimator 343 estimates the external parameter P1' of the left camera 15A by the first to third steps, but the estimator 343 may estimate the external parameter P2' of the right camera 15B. In this case, on the basis of the external parameter P2' obtained by the estimator 343 and the external parameter P2 at the time of the previous setting, the deviation detector 347 may provisionally determine whether or not a deviation related to the external parameter has occurred in either the left camera 15A or the right camera 15B.

In addition, the deviation detector 347 may perform not a binary determination of whether or not a deviation has occurred but a determination divided into a plurality of stages such as a degree of danger or a determination related to a deviation as a continuous value such as the probability of occurrence of the deviation. In this case, the notification information generator 351 and the operation controller 355 may generate the notification information according to the degree of danger and control the operation apparatus 20.

In addition, in FIGS. 11A to 11C, an example has been described in which the provisional deviation determination processing is executed from the image group obtained by the imaging by the stereo camera 10 at the two timings of t=T and t=T-T1. However, the provisional deviation determination processing may be executed from the image group obtained by imaging by the stereo camera 10 at three or more timings.

In addition, the deviation detector 347 may set a result of one provisional determination processing as a final determination result, but may estimate the final determination result on the basis of results of a plurality of provisional determination processings. Next, an example of final determination as to whether or not a deviation has occurred according to the present disclosure will be described.

(Final Determination as to Whether or not Deviation has Occurred)

Figure 12:
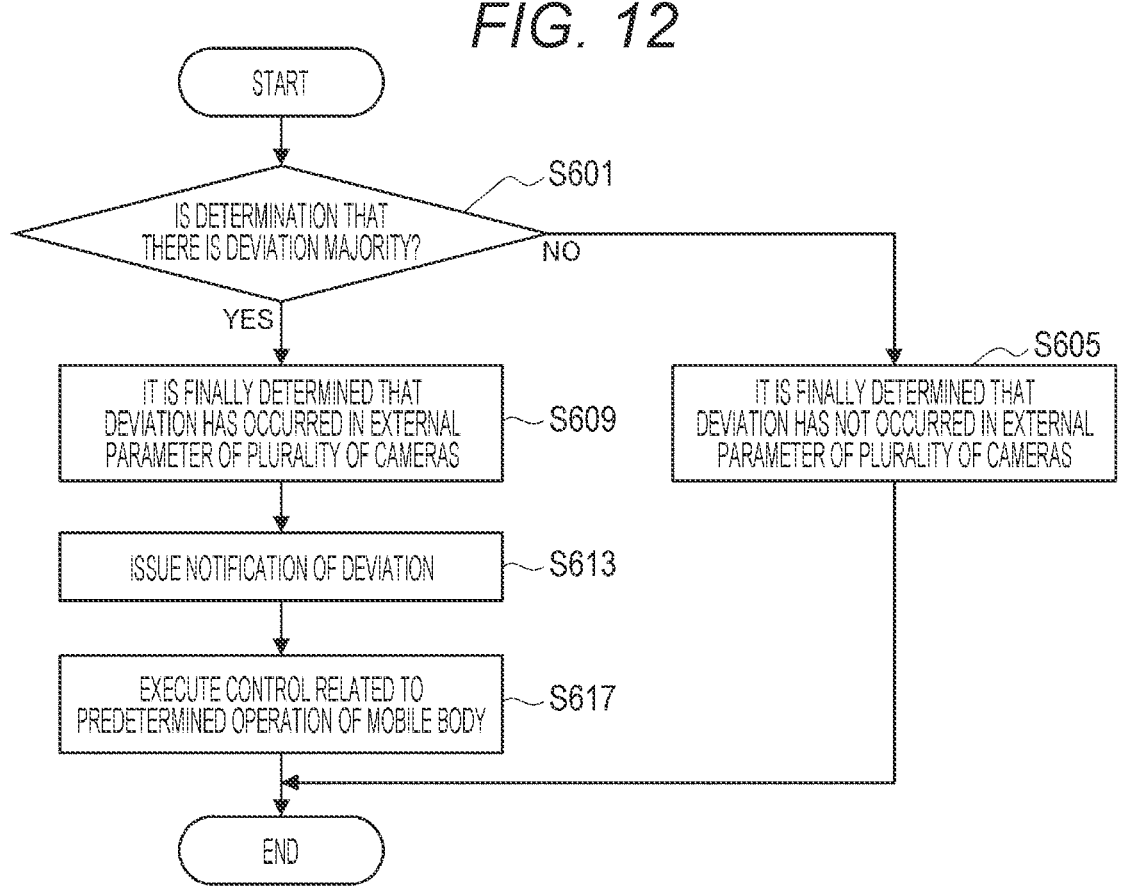
FIG. 12 is an explanatory diagram for describing an example of final determination as to whether or not a deviation has occurred according to the present disclosure.

FIG. 12 is an explanatory diagram for describing an example of the final determination as to whether or not a deviation has occurred according to the present disclosure. First, the deviation detector 347 determines whether or not a determination result indicating that there is a deviation is a majority among the results of the provisional deviation determination executed the predetermined number of times (S601). In a case where the determination result that there is a deviation is not a majority (S601/No), the processing proceeds to S605, and in a case where the determination result that there is a deviation is a majority (S601/Yes), the processing proceeds to S609.

In a case where the determination result that there is a deviation is not a majority (S601/No), the deviation detector 347 determines that a deviation related to the external parameter of the stereo camera 10 has not occurred, and the information processing apparatus 30 according to the present disclosure ends the processing.

In a case where the determination result that there is a deviation is a majority (S601/YES), the deviation detector 347 determines that a deviation related to the external parameter of the stereo camera 10 has occurred (S609).

Then, the notification information generator 351 generates notification information related to the deviation, and causes communicator 310 to transmit the notification information to the information terminal TB (S613).

Then, the operation controller 355 executes control related to a predetermined operation of the mobile body 5 (for example, speed restriction of the mobile body 5) (S617), and the information processing apparatus 30 according to the present disclosure ends the processing.

Figure 13:
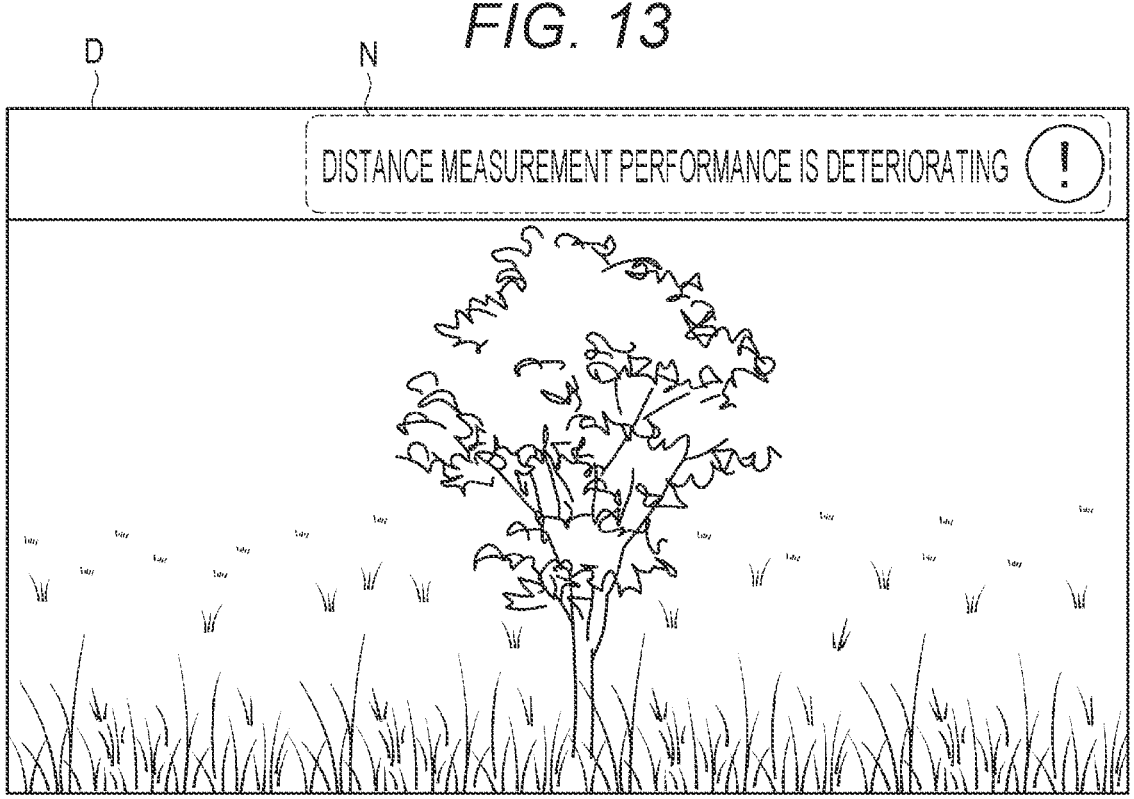
FIG. 13 is an explanatory diagram for describing an example of notification information generated by a notification information generator 351.

FIG. 13 is an explanatory diagram for describing an example of the notification information generated by the notification information generator 351. A display D of the information terminal TB may display notification information N related to the deviation in addition to a video acquired by the stereo camera as illustrated in FIG. 13, for example.

Note that the notification information N may be notification information by a video as illustrated in FIG. 13 or notification information by audio.

Furthermore, the notification information generator 351 may generate notification information for obtaining permission as to whether or not control related to a predetermined operation may be executed by the operation controller 355. For example, in a case where the user selects that the control related to the predetermined operation may be executed, the operation controller 355 may execute the control related to the predetermined operation of the mobile body 5.

In addition, the deviation detector 347 may include the image group determined to be not suitable for the deviation determination processing in S525 in FIG. 10 in the provisional determination result of the deviation as an indistinguishable vote. For example, in a case where the number of indistinguishable votes is the largest of the provisional determination results of the deviation executed the predetermined number of times, the deviation detector 347 may finally determine whether or not a deviation has occurred is "indistinguishable".

An example of the operation processing of the information processing apparatus 30 according to the present disclosure has been described above. Next, examples of operations and effects according to the present disclosure will be described.

5. Examples of Operations and Effects

The present disclosure described above makes it possible to obtain various operations and effects. For example, it is possible to determine whether or not a deviation related to the external parameter has occurred in the left camera 15A or the right camera 15B on the basis of the image group obtained by imaging by the stereo camera 10. Therefore, it is possible to detect a deviation in an image plane horizontal direction (the y direction) in addition to an image plane vertical direction (the x direction) of the left camera 15A or the right camera 15B without using sensing information by other sensors.

Furthermore, the estimator 343 according to the present disclosure determines whether or not an image group is suitable for the deviation determination. As a result, it is possible to exclude an image group inappropriate for the deviation determination from the determination processing, and the deviation detector 347 can detect the deviation having occurred in the left camera 15A or the right camera 15B with higher accuracy.

Furthermore, the deviation detector 347 according to the present disclosure provisionally determines whether or not a deviation has occurred a plurality of times, and determines that a deviation related to an external parameter has occurred in the left camera 15A or the right camera 15B when the number of times of provisional determination that the deviation has occurred satisfies a predetermined standard. As a result, the deviation detector 347 can reduce the influence of erroneous determination that can occur in one determination result, and can determine whether or not the deviation has occurred with higher accuracy.

6. Hardware Configuration Example

The embodiments of the present disclosure have been described above. Each information processing described above is achieved by cooperation of software and hardware of the information processing apparatus 30 described below.

Note that a hardware configuration described below can be also applied to the information terminal TB.

Figure 14:
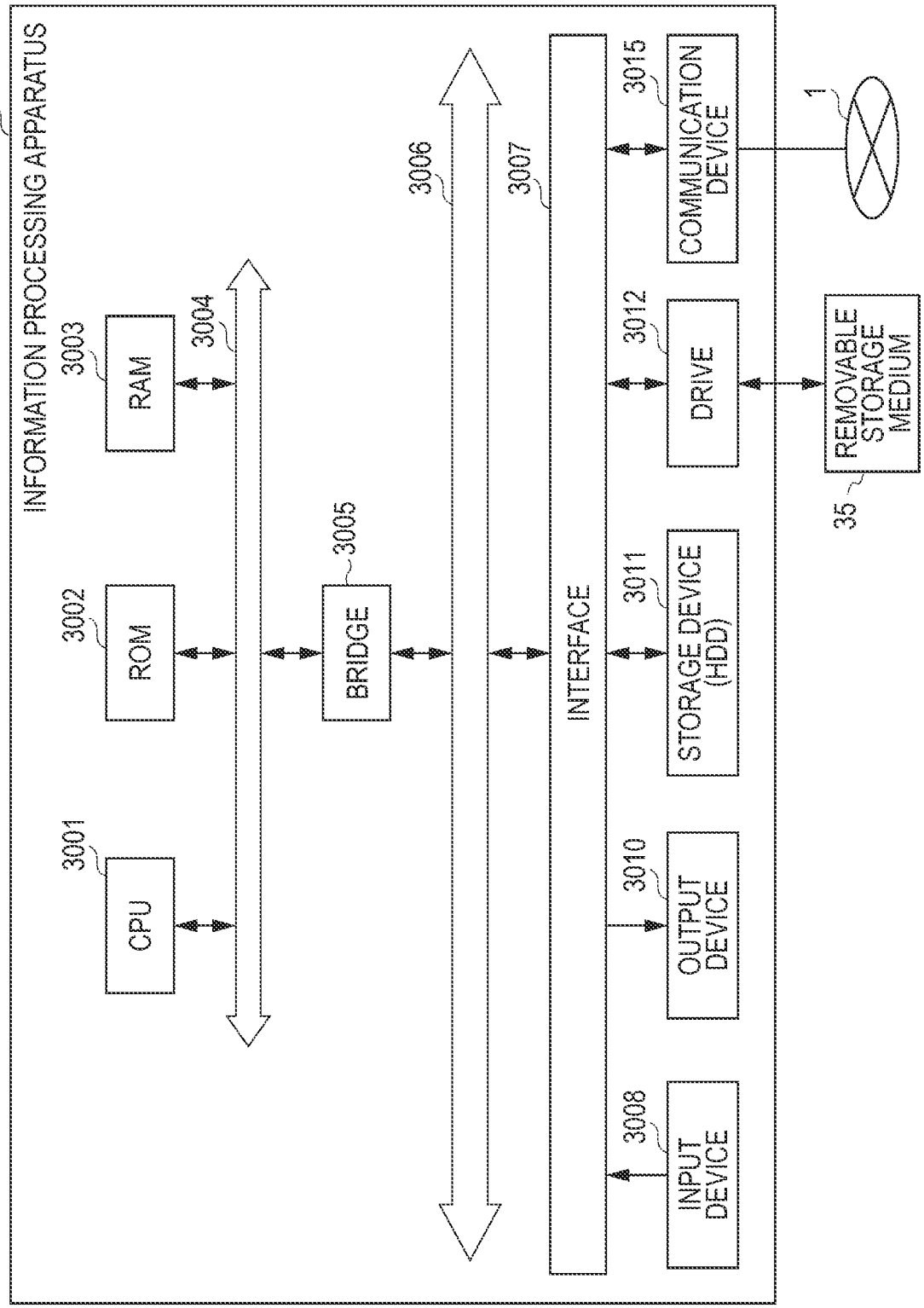
FIG. 14 is a block diagram illustrating a hardware configuration of the information processing apparatus 30.

FIG. 14 is a block diagram illustrating the hardware configuration of the information processing apparatus 30. The information processing apparatus 30 includes a central processing unit (CPU) 3001, a read only memory (ROM) 3002, a random access memory (RAM) 3003, and a host bus 3004. Furthermore, the information processing apparatus 30 includes a bridge 3005, an external bus 3006, an interface 3007, an input device 3008, an output device 3010, a storage device (HDD) 3011, a drive 3012, and a communication apparatus 3015.

The CPU 3001 functions as a calculation processing device and a control device, and controls the overall operation in the information processing apparatus 30 in accordance with various programs. Furthermore, the CPU 3001 may be a microprocessor. The ROM 3002 stores, for example, programs, operation parameters, and the like that are used by the CPU 3001. The RAM 3003 temporarily stores, for example, the programs used during execution of the CPU 3001, and parameters and the like that change as appropriate during the execution. These are connected to each other by the host bus 3004 including a CPU bus. Functions of the estimator 343, the deviation detector 347, and the like described with reference to FIG. 2 can be achieved by cooperation of the CPU 3001, the ROM 3002, the RAM 3003, and the software.

The host bus 3004 is connected to the external bus 3006 such as a peripheral component interconnect/interface (PCI) bus via the bridge 3005. Note that the host bus 3004, the bridge 3005, and the external bus 3006 are not necessarily configured separately, and functions thereof may be mounted on one bus.

The input device 3008 includes an input unit for allowing a user to input information, such as a mouse, a keyboard, a touch panel, a button, a microphone, a switch, and a lever, and an input control circuit that generates an input signal on the basis of an input by the user, and outputs the input signal to the CPU 3001. By operating the input device 3008, the user of the information processing apparatus 30 can input various data into the information processing apparatus 30, or instruct the information processing apparatus 30 to perform a processing operation.

For example, the output device 3010 includes display devices such as a liquid crystal display device, an OLED device, and a lamp. Furthermore, the output device 3010 includes an audio output device such as a speaker and headphones. The output device 3010 outputs, for example, a reproduced content. Specifically, the display device displays various types of information such as reproduced video data as text or images. On the other hand, the audio output device converts audio data and the like into audio and outputs the audio.

The storage device 3011 is a device for storing data. The storage device 3011 may include a storage medium, a recording device that records data in the storage medium, a reading device that reads data from the storage medium, and a deletion device that deletes data recorded on the storage medium. The storage device 3011 includes a hard disk drive (HDD), for example. The storage device 3011 drives a hard disk and stores programs to be executed by the CPU 3001 and various data.

The drive 3012 is a reader-writer for a storage medium, and is built in or externally attached to the information processing apparatus 30. The drive 3012 reads information recorded in a removable storage medium 35 mounted thereon, such as a magnetic disc, an optical disc, a magneto-optical disc, or a semiconductor memory, and outputs the information to the RAM 3003. Furthermore, the drive 3012 can also write information to the removable storage medium 35.

The communication apparatus 3015 is, for example, a communication interface including a communication device or the like for connection to a network 1. Furthermore, the communication apparatus 3015 may be a wireless LAN capable communication apparatus, a long term evolution (LTE) capable communication apparatus, or a wire communication apparatus that performs wired communication.

A hardware configuration example according to the present disclosure has been described. Next, a supplement according to the present disclosure will be described.

7. Supplement

The preferred embodiments of the present disclosure have been described in detail above with reference to the accompanying drawings, but the present disclosure is not limited to such examples. It is apparent that a person having ordinary knowledge in the technical field to which the present disclosure belongs can devise various change examples or modification examples within the scope of the technical idea described in the claims, and it will be naturally understood that such examples also belong to the technical scope of the present disclosure.

For example, the example in which the information processing apparatus 30 is mounted on the mobile body 5 has been mainly described in the present specification. However, the function of the information processing apparatus 30 may be achieved by the information terminal TB. For example, the stereo camera 10 transmits an image group obtained by imaging the subject to the information terminal TB. Then, on the basis of the received image group, the information terminal TB may execute various processing related to the determination as to whether or not a deviation related to the external parameter has occurred in the left camera 15A or the right camera 15B.

In addition, it may be desirable that the image in which the feature point is detected by the feature point detector 335 is not blurred. Therefore, the feature point detector 335 may detect a blur amount from the image in which the feature point is detected, and may detect the feature point from the image in which the blur amount is less than a predetermined value. Furthermore, in a case where the mobile body 5 includes a sensor that acquires motion information such as an inertial measurement unit (IMU), the feature point detector 335 may estimate the blur amount on the basis of the motion information acquired by the sensor.

Furthermore, each procedure related to the processing of the information processing apparatus 30 in the present specification is not necessarily processed in time series in the order described in the flowchart. For example, each procedure in the processing of the information processing apparatus 30 may be performed in an order different from the order described in the flowchart, or may be performed in parallel.

Furthermore, it is also possible to create a computer program for causing hardware built in the information processing apparatus 30 and the information terminal TB, such as a CPU, a ROM, and a RAM, to exhibit a function equivalent to each configuration of the information processing apparatus 30 and the information terminal TB described above. In addition, a storage medium storing the computer program is also provided.

Furthermore, the effects herein described are merely exemplary or illustrative, and not restrictive. That is, the technique according to the present disclosure can exhibit other effects apparent to those skilled in the art from the description of this specification, in addition to the effects above or instead of the effects above.

Note that the following configurations also fall within the technical scope of the present disclosure.

(1)

An information processing apparatus includes a calculator that calculates a three-dimensional position of a feature point on the basis of each of images obtained by imaging a subject at a first timing by a plurality of cameras and an external parameter of the plurality of cameras, the feature point being included in each of the images, a first estimator that estimates a first external parameter on the basis of one image included in the images obtained by imaging the subject at a second timing by the plurality of cameras and the three-dimensional position of the feature point, the first external parameter being an external parameter of a camera that has captured the one image among the plurality of cameras at the second timing, a second estimator that estimates a second external parameter that is an external parameter of any one camera of the plurality of cameras at the first timing on the basis of the first external parameter estimated by the first estimator, and a determiner that determines whether or not a deviation related to the external parameter has occurred in the plurality of cameras on the basis of the second external parameter of any one camera of the plurality of cameras and a previous external parameter of the any one camera, the second external parameter having been estimated by the second estimator.

(2)

In the information processing apparatus according to (1) described above, the calculator calculates the three-dimensional position of the feature point included in each of the images on the basis of each of the images obtained by imaging the subject at the first timing and the external parameter of the plurality of cameras when a number of feature points included in an image group obtained by imaging the subject at the first timing and the second timing by the plurality of cameras is a predetermined number or more.

(3)

The information processing apparatus according to (1) or (2) described above further includes a discriminator that discriminates, with respect to a feature point included in one of the images, a feature point having a highest correlation degree of feature points included in another one of the images as a set of feature points, in which the calculator calculates the three-dimensional position of the feature point included in each of the images on the basis of the feature points discriminated as the set of feature points among the feature points included in each of the images and the external parameter of the plurality of cameras.

(4)

In the information processing apparatus according to (3) described above, the calculator calculates the three-dimensional position of the feature point included in each of the images on the basis of the feature points discriminated as the set of feature points and the external parameter of the plurality of cameras when a number of the sets of feature points included in the images obtained by imaging the subject at the first timing by the plurality of cameras satisfies a predetermined condition.

(5)

in the information processing apparatus according to (4) described above, the predetermined condition includes a case where the number of the sets of feature points is a predetermined number or more.

(6)

In the information processing apparatus according to any one of (1) to (5) described above, the calculator calculates the three-dimensional position of the feature point included in each of the images when a change amount of captured image position of the feature point between the first timing and the second timing is a predetermined value or more.

(7)

In the information processing apparatus according to any one of (1) to (6) described above, on the basis of another image different from the one image included in the images obtained by imaging the subject at the second timing by the plurality of cameras and the three-dimensional position of the feature point, the first estimator estimates an external parameter of a camera that has captured the another image among the plurality of cameras at the second timing.

(8)

In the information processing apparatus according to (7) described above, the second estimator estimates the second external parameter of any one of the plurality of cameras at the first timing on the basis of the first external parameter of the plurality of cameras at the second timing, the first external parameter having been estimated by the first estimator.

(9)

The information processing apparatus according to any one of (1) to (8) described above further includes a notifier that notifies a user who uses the plurality of cameras of a deviation when the determiner determines that the deviation related to the external parameter has occurred in the plurality of cameras.

(10)

The information processing apparatus according to any one of (1) to (9) described above further includes an operation controller that executes control related to a predetermined operation of a mobile body on which the plurality of cameras is mounted when the determiner determines that the deviation related to the external parameter has occurred in the plurality of cameras.

(11)

In the information processing apparatus according to (9) or (10) described above, the determiner provisionally determines whether or not the deviation related to the external parameter has occurred in the plurality of cameras a plurality of times by using a plurality of image groups, and determines that the deviation related to the external parameter has occurred in the plurality of cameras when a number of times of provisional determination that the deviation related to the external parameter has occurred satisfies a predetermined standard.

(12)

In the information processing apparatus according to (11) described above, the predetermined standard includes a case where a number of times of provisional determination that a deviation related to orientation information of the plurality of cameras has occurred is equal to or greater than a number of times of provisional determination that the deviation has not occurred.

(13)

An information processing method executed by a computer, the method includes calculating a three-dimensional position of a feature point on the basis of each of images obtained by imaging a subject at a first timing by a plurality of cameras and an external parameter of the plurality of cameras, the feature point being included in each of the images, estimating a first external parameter on the basis of one image included in the images obtained by imaging the subject at a second timing by the plurality of cameras and the three-dimensional position of the feature point, the first external parameter being an external parameter of a camera that has captured the one image among the plurality of cameras at the second timing, estimating a second external parameter that is an external parameter of any one camera of the plurality of cameras at the first timing on the basis of the first external parameter estimated by the first estimator, and determining whether or not a deviation related to the external parameter has occurred in the plurality of cameras on the basis of the second external parameter of any one camera of the plurality of cameras and a previous external parameter of the any one camera, the second external parameter having been estimated by the second estimator.

(14)

A program causing a computer to implement a calculation function that calculates a three-dimensional position of a feature point on the basis of each of images obtained by imaging a subject at a first timing by a plurality of cameras and an external parameter of the plurality of cameras, the feature point being included in each of the images, a first estimation function that estimates a first external parameter on the basis of one image included in the images obtained by imaging the subject at a second timing by the plurality of cameras and the three-dimensional position of the feature point, the first external parameter being an external parameter of a camera that has captured the one image among the plurality of cameras at the second timing, a second estimation function that estimates a second external parameter that is an external parameter of any one camera of the plurality of cameras at the first timing on the basis of the first external parameter estimated by the first estimation function, and a determination function that determines whether or not a deviation related to the external parameter has occurred in the plurality of cameras on the basis of the second external parameter of any one camera of the plurality of cameras and a previous external parameter of the any one camera, the second external parameter having been estimated by the second estimation function.

REFERENCE SIGNS LIST

1 Network
5 Mobile body
10 Stereo camera
15A Left camera
15B Right camera
20 Operation apparatus
30 Information processing apparatus
310 Communicator
320 Storage
330 Controller
331 Image processor
335 Feature point detector
339 Pair discriminator
343 Estimator
347 Deviation detector
351 Notification information generator
355 Operation controller
359 Distance measurer
363 Distance measurement data utilization unit

The invention claimed is:

1. An information processing apparatus comprising:
a calculator that calculates a three-dimensional position of a feature point on a basis of each of images obtained by imaging a subject at a first timing by a plurality of cameras and an external parameter of the plurality of cameras, the feature point being included in each of the images;
a first estimator that estimates a first external parameter on a basis of one image included in the images obtained by imaging the subject at a second timing by the plurality of cameras and the three-dimensional position of the feature point, the first external parameter being an external parameter of a camera that has captured the one image among the plurality of cameras at the second timing;
a second estimator that estimates a second external parameter that is an external parameter of any one camera of the plurality of cameras at the first timing on a basis of the first external parameter estimated by the first estimator; and
a determiner that determines whether or not a deviation related to the external parameter has occurred in the plurality of cameras on a basis of the second external parameter of any one camera of the plurality of cameras and a previous external parameter of the any one camera, the second external parameter having been estimated by the second estimator.

2. The information processing apparatus according to claim 1, wherein the calculator calculates the three-dimensional position of the feature point included in each of the images on a basis of each of the images obtained by imaging the subject at the first timing and the external parameter of the plurality of cameras when a number of feature points included in an image group obtained by imaging the subject at the first timing and the second timing by the plurality of cameras is a predetermined number or more.

3. The information processing apparatus according to claim 2, further comprising a discriminator that discriminates, with respect to a feature point included in one of the images, a feature point having a highest correlation degree of feature points included in another one of the images as a set of feature points, wherein
the calculator calculates the three-dimensional position of the feature point included in each of the images on a basis of the feature points discriminated as the set of feature points among the feature points included in each of the images and the external parameter of the plurality of cameras.

4. The information processing apparatus according to claim 3, wherein the calculator calculates the three-dimensional position of the feature point included in each of the images on a basis of the feature points discriminated as the set of feature points and the external parameter of the plurality of cameras when a number of the sets of feature points included in the images obtained by imaging the subject at the first timing by the plurality of cameras satisfies a predetermined condition.

5. The information processing apparatus according to claim 4, wherein the predetermined condition includes a case where the number of the sets of feature points is a predetermined number or more.

6. The information processing apparatus according to claim 5, wherein the calculator calculates the three-dimensional position of the feature point included in each of the images when a change amount of captured image position of the feature point between the first timing and the second timing is a predetermined value or more.

7. The information processing apparatus according to claim 6, wherein, on a basis of another image different from the one image included in the images obtained by imaging the subject at the second timing by the plurality of cameras and the three-dimensional position of the feature point, the first estimator estimates an external parameter of a camera that has captured the another image among the plurality of cameras at the second timing.

8. The information processing apparatus according to claim 7, wherein the second estimator estimates the second external parameter of any one of the plurality of cameras at the first timing on a basis of the first external parameter of the plurality of cameras at the second timing, the first external parameter having been estimated by the first estimator.

9. The information processing apparatus according to claim 8, further comprising a notifier that notifies a user who uses the plurality of cameras of a deviation when the determiner determines that the deviation related to the external parameter has occurred in the plurality of cameras.

10. The information processing apparatus according to claim 9, further comprising an operation controller that executes control related to a predetermined operation of a mobile body on which the plurality of cameras is mounted when the determiner determines that the deviation related to the external parameter has occurred in the plurality of cameras.

11. The information processing apparatus according to claim 10, wherein the determiner provisionally determines whether or not the deviation related to the external parameter has occurred in the plurality of cameras a plurality of times by using a plurality of image groups, and determines that the deviation related to the external parameter has occurred in the plurality of cameras when a number of times of provisional determination that the deviation related to the external parameter has occurred satisfies a predetermined standard.

12. The information processing apparatus according to claim 11, wherein the predetermined standard includes a case where a number of times of provisional determination that a deviation related to orientation information of the plurality of cameras has occurred is equal to or greater than a number of times of provisional determination that the deviation has not occurred.

13. An information processing method executed by a computer, the method comprising:
    calculating a three-dimensional position of a feature point on a basis of each of images obtained by imaging a subject at a first timing by a plurality of cameras and an external parameter of the plurality of cameras, the feature point being included in each of the images;
    estimating a first external parameter on a basis of one image included in the images obtained by imaging the subject at a second timing by the plurality of cameras and the three-dimensional position of the feature point, the first external parameter being an external parameter of a camera that has captured the one image among the plurality of cameras at the second timing;
    estimating a second external parameter that is an external parameter of any one camera of the plurality of cameras at the first timing on a basis of the first external parameter estimated; and
    determining whether or not a deviation related to the external parameter has occurred in the plurality of cameras on a basis of the second external parameter of any one camera of the plurality of cameras and a previous external parameter of the any one camera, the second external parameter having been estimated.

14. A non-transitory computer-readable medium having embodied thereon a program, which when executed by a computer causes the computer to execute a method, the method comprising:
    calculating a three-dimensional position of a feature point on a basis of each of images obtained by imaging a subject at a first timing by a plurality of cameras and an external parameter of the plurality of cameras, the feature point being included in each of the images;
    estimating a first external parameter on a basis of one image included in the images obtained by imaging the subject at a second timing by the plurality of cameras and the three-dimensional position of the feature point, the first external parameter being an external parameter of a camera that has captured the one image among the plurality of cameras at the second timing;
    estimating a second external parameter that is an external parameter of any one camera of the plurality of cameras at the first timing on a basis of the first external parameter estimated; and
    determining whether or not a deviation related to the external parameter has occurred in the plurality of cameras on a basis of the second external parameter of any one camera of the plurality of cameras and a previous external parameter of the any one camera, the second external parameter having been estimated.

* * * * *